United States Patent
Siahaan et al.

(10) Patent No.: US 8,280,093 B2
(45) Date of Patent: *Oct. 2, 2012

(54) DEFORMABLE EAR TIP FOR EARPHONE AND METHOD THEREFOR

(75) Inventors: Edward Siahaan, San Francisco, CA (US); Kurt Stiehl, San Jose, CA (US); Victor Tiscareno, Issaquah, WA (US); Wey-Jiun Lin, Los Altos Hills, CA (US); Cameron Frazier, San Carlos, CA (US); Christopher Prest, San Francisco, CA (US); Jeffrey Hayashida, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 280 days.

This patent is subject to a terminal disclaimer.

(21) Appl. No.: 12/794,690

(22) Filed: Jun. 4, 2010

(65) Prior Publication Data

US 2010/0246879 A1 Sep. 30, 2010

Related U.S. Application Data

(63) Continuation-in-part of application No. 12/205,748, filed on Sep. 5, 2008.

(60) Provisional application No. 61/230,065, filed on Jul. 30, 2009, provisional application No. 61/240,582, filed on Sep. 8, 2009.

(51) Int. Cl.
*H04R 1/10* (2006.01)
*B29C 43/56* (2006.01)

(52) U.S. Cl. ........................ 381/380; 381/382
(58) Field of Classification Search ................... 381/380, 381/322, 324, 328

See application file for complete search history.

(56) References Cited

U.S. PATENT DOCUMENTS

| | | | |
|---|---|---|---|
| 2,803,308 A | 8/1957 | Di Mattia |
| 2,888,921 A | 6/1959 | Nielson et al. |
| 3,303,902 A | 2/1967 | Knott |
| 3,710,888 A | 1/1973 | Peart |
| 3,935,401 A | 1/1976 | Shore et al. |
| 4,607,720 A | 8/1986 | Hardt |
| 4,852,684 A | 8/1989 | Packard |
| 4,879,750 A | 11/1989 | Nassler |
| 4,880,076 A | 11/1989 | Ahlberg et al. |
| 4,972,488 A | 11/1990 | Weiss et al. |
| 5,002,151 A | 3/1991 | Oliveira et al. |
| 5,288,953 A | 2/1994 | Peart |
| 5,401,920 A | 3/1995 | Oliveira |
| 5,449,865 A | 9/1995 | Desnick et al. |
| 5,824,968 A | 10/1998 | Packard et al. |
| 5,988,313 A | 11/1999 | Håkansson |
| 6,129,174 A | 10/2000 | Brown et al. |

(Continued)

OTHER PUBLICATIONS

Office Action for U.S. Appl. No. 12/205,749, mailed Aug. 31, 2011.

(Continued)

*Primary Examiner* — Yuwen Pan
*Assistant Examiner* — Phan Le

(57) ABSTRACT

A removable component for use with an earphone is disclosed. As an example, the removable component can be an ear tip. According to one aspect, an improved ear tip can be provided for use with a headphone. The ear tip is suitable for in-ear operation and can have a cosmetic deformable outer member. The deformable outer member can enable the ear tip to readily conform to a user's ear. The ear tip can also include an inner member to structurally support the outer member and to facilitate attachment to a headphone. Methods for forming such ear tips are also disclosed.

32 Claims, 28 Drawing Sheets

U.S. PATENT DOCUMENTS

| | | |
|---|---|---|
| 6,513,621 B1 | 2/2003 | Deslauriers et al. |
| 6,671,381 B1 | 12/2003 | Lux-Wellenhof |
| 6,860,362 B2 | 3/2005 | Saltykov |
| 6,938,622 B2 | 9/2005 | Huang |
| 7,349,550 B2 | 3/2008 | Oliveira et al. |
| 7,464,786 B2 | 12/2008 | Falco et al. |
| 7,548,629 B1 | 6/2009 | Griffin |
| 7,627,131 B2 | 12/2009 | Nielsen et al. |
| 2002/0085728 A1 | 7/2002 | Shennib et al. |
| 2003/0051939 A1 | 3/2003 | Werblud |
| 2004/0062412 A1 | 4/2004 | Nassimi |
| 2005/0094835 A1 | 5/2005 | Doty |
| 2006/0147071 A1 | 7/2006 | Neilson |
| 2006/0171549 A1 | 8/2006 | Holmes |
| 2006/0180387 A1 | 8/2006 | Elliott |
| 2006/0233411 A1 | 10/2006 | Utigard |
| 2007/0189570 A1 | 8/2007 | Matsuo et al. |
| 2007/0201717 A1 | 8/2007 | Dyer et al. |
| 2007/0221232 A1 | 9/2007 | Jenkins |
| 2007/0284182 A1 | 12/2007 | Mu |
| 2008/0013767 A1 | 1/2008 | Olsen et al. |
| 2008/0031481 A1 | 2/2008 | Warren |
| 2008/0187159 A1 | 8/2008 | Blanchard |
| 2008/0187161 A1 | 8/2008 | Tiemens et al. |
| 2008/0205679 A1 | 8/2008 | Darbut et al. |
| 2008/0240485 A1 | 10/2008 | Dyer et al. |
| 2008/0240486 A1 | 10/2008 | Garcia |
| 2009/0052711 A1 | 2/2009 | Murozaki |
| 2009/0101433 A1 | 4/2009 | Stiehl et al. |
| 2009/0103760 A1 | 4/2009 | Stiehl et al. |
| 2009/0103764 A1 | 4/2009 | Stiehl et al. |
| 2009/0136074 A1 | 5/2009 | Chang et al. |
| 2009/0233652 A1 | 9/2009 | Yang |
| 2009/0304220 A1 | 12/2009 | Fujikura et al. |

OTHER PUBLICATIONS

Final Office Action for U.S. Appl. No. 12/205,749, mailed Jan. 19, 2012.
Office Action for U.S. Appl. No. 12/205,748, mailed Aug. 31, 2011.
Final Office Action for U.S. Appl. No. 12/205,748, mailed Feb. 2, 2012.
Office Action for U.S. Appl. No. 12/124,471, mailed Dec. 10, 2010.
Final Office Action for U.S. Appl. No. 12/124,471, mailed Aug. 2, 2011.
Office Action for U.S. Appl. No. 12/124,471, mailed Feb. 28, 2012.
Notice of Allowance for U.S. Appl. No. 12/205,748, mailed May 1, 2012.
Office Action for U.S. Appl. No. 12/124,471 dated Dec. 22, 2009.
Office Action for U.S. Appl. No. 12/124,471 dated Jul. 22, 2010.

DEFORMABLE EAR TIP FOR EARPHONE AND METHOD THEREFOR

CROSS-REFERENCE TO RELATED APPLICATIONS

This application is a Continuation-In-Part of U.S. patent application Ser. No. 12/205,748, filed Sep. 5, 2008, entitled "REMOVABLE EAR TIP FOR EARPHONE", which is hereby incorporated herein by reference.

This application also claims priority benefit of: (i) U.S. Provisional Patent Application No. 61/230,065, filed Jul. 30, 2009, entitled "DEFORMABLE EAR TIP FOR EARPHONE", which is hereby incorporated herein by reference; and (ii) U.S. Provisional Patent Application No. 61/240,582, filed Sep. 8, 2009, entitled "DEFORMABLE EAR TIP FOR EARPHONE", which is hereby incorporated herein by reference.

BACKGROUND OF THE INVENTION

Several different approaches can be used to provide audio from an electronic device to a user. For example, the electronic device may include or be coupled to a speaker or speaker system operative to provide audio. As another example, the electronic device may be coupled to a headset or headphone for providing audio directly to the user's ears. A headset or headphone (or earphone) is a device that converts electric signals, such as from an electronic device, to audible sound and fits over or in a user's ear. Headphones come in various types and configurations. One type of headset or headphone is over-the-ear, and another type of headset or headphone is in-ear.

To improve a user's comfort, a headset or headphone may include one or more elements operative to provide a pleasant interface between the audio components of the headset (e.g., the ear piece) and the user's ears. For example, some headsets or headphones may include an over-the-ear type ear piece that is operative to be placed on or over the user's ear. The ear piece may include one or more foam or cloth components that provide a compliant fit against the user's ear. As another example, some headsets or headphones may include an in-the-ear type ear piece (e.g., an ear bud) operative to fit inside the user's ear.

In-ear headsets or headphones offer superior audio performance. Unfortunately, however, in-ear headsets or headphones have difficultly providing a proper fit with a user's ear while also being comfortable while being worn.

SUMMARY OF THE INVENTION

The invention pertains to a removable component for use with an earphone. As an example, the removable component can be an ear tip and the ear tip can be at least partially deformable.

According to one aspect, the invention can pertain to an ear tip for use with a headphone. The ear tip can include a deformable outer member and is suitable for in-ear operation. The deformable outer member enables the ear tip to readily conform to a user's ear. The ear tip can also include an inner member to structurally support the outer member and to facilitate attachment to a headphone. The deformable outer member can be configured to deform around the inner member. The deformable outer member can be provided with a durable outer surface that can be cosmetically pleasing.

The invention may be implemented in numerous ways, including, but not limited to, as a system, device, apparatus, or method. Exemplary embodiments of the invention are discussed below.

As an ear tip for a headphone, one embodiment can include at least an inner cylindrical structure configured to removably attach to the headphone, and an outer spherical structure integral with or adhered to at least a top end and sides of the inner cylindrical structure. The outer spherical structure can be formed at least partially from a deformable material. The deformable material can also include a cosmetic surface.

As an ear tip for a headphone, another embodiment can include at least an inner cylindrical structure configured to removably attach to the headphone, and an outer spherical structure integral with or adhered to at least sides of the inner cylindrical structure. The outer spherical structure can be formed at least partially from a deformable material. The inner cylindrical structure can also extend substantially through the ear tip.

As an ear tip for a headphone, still another embodiment can include at least an inner cylindrical structure configured to removably attach to the headphone, and an outer rounded structure integral with or adhered to said inner cylindrical structure. The outer rounded structure being formed at least partially from a deformable material. The ear tip can also include an outer film provided around the outer spherical structure to provide an outer surface for the ear tip.

As a method for forming ear tips, one embodiment can include at least configuring a molding station having a top and bottom molding plates, first compression molding an inner structure using a first moldable material, and curing the formed inner structure. Thereafter, the method can include at least reconfiguring the molding station by replacing one of the top and bottom molding plates, second compression molding at least a portion of an outer structure using a second moldable material, and curing the at least a portion of the outer structure that has been formed by the second compression molding. The method can then conclude by removing a resulting ear tip from the molding station.

A method for forming ear tips, another embodiment can include at least configuring a molding station having a top and bottom molding plates, first compression molding an outer structure using a first moldable material, and curing the formed outer structure. Thereafter, the method can include at least reconfiguring the molding station by replacing at least one of the top and bottom molding plates, second compression molding at least a portion of an inner structure using a second moldable material, and curing the at least a portion of the inner structure that has been formed by the second compression molding. The method can then conclude by removing a resulting ear tip from the molding station.

As method for forming an ear tip, another embodiment can include at least providing an inner structure for an ear tip, providing a top mold having at least one protrusion, and providing a bottom mold having an ear tip cavity. The method can also include at least depositing a quantity of a second material into and/or adjacent the ear tip cavity, and coupling the top and bottom molds together with the protrusion being inserted into the cavity. Still further, the method can include at least curing the ear tip being formed within the cavity, and removing the formed ear tip from the bottom mold.

As a method for forming an ear tip, still another embodiment can include at least forming an inner structure for an ear tip, providing a top mold having at least one protrusion, and providing a porous bottom mold having an ear tip cavity. Further, the method can include placing a sheet of a first material over the cavity, wherein the sheet being used to form an outer film for the ear tip, depositing a quantity of a second material on the sheet and adjacent the cavity, and applying a vacuum to the porous bottom mold to draw the sheet of the first material and the at least a portion of the deposited second material into the cavity. In addition, the method can include placing the molded inner structure onto the protrusion, heating the cavity, and coupling the top and bottom molds together with the protrusion being inserted into the cavity. Still further, the method can include curing the ear tip being formed within the cavity. Following curing, the method can further include removing the top mold, removing excess portions of the first material and the second material, and removing the formed ear tip from the bottom mold.

Various aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, in which.

DETAILED DESCRIPTION OF THE INVENTION

The invention pertains to a removable component for use with an earphone. As an example, the removable component can be an ear tip and the ear tip can be at least partially deformable.

According to one aspect, the invention can pertain to an ear tip for use with a headphone. The ear tip can include a deformable outer member and is suitable for in-ear operation. The deformable outer member enables the ear tip to readily conform to a user's ear. The ear tip can also include an inner member to structurally support the outer member and to facilitate attachment to a headphone. The deformable outer member is configured to deform around the inner member. The deformable outer member can be provided with an outer cosmetic surface.

Exemplary embodiments of aspects of the invention are discussed below with reference to the various figures. However, those skilled in the art will readily appreciate that the detailed description given herein with respect to these figures is for explanatory purposes, as the invention extends beyond these embodiments. It should be noted that the embodiments are in many cases are not depicted in an actual or consistent scale. For example, embodiments are often depicted larger than actual product size for ease of illustration.

Figure 1A:
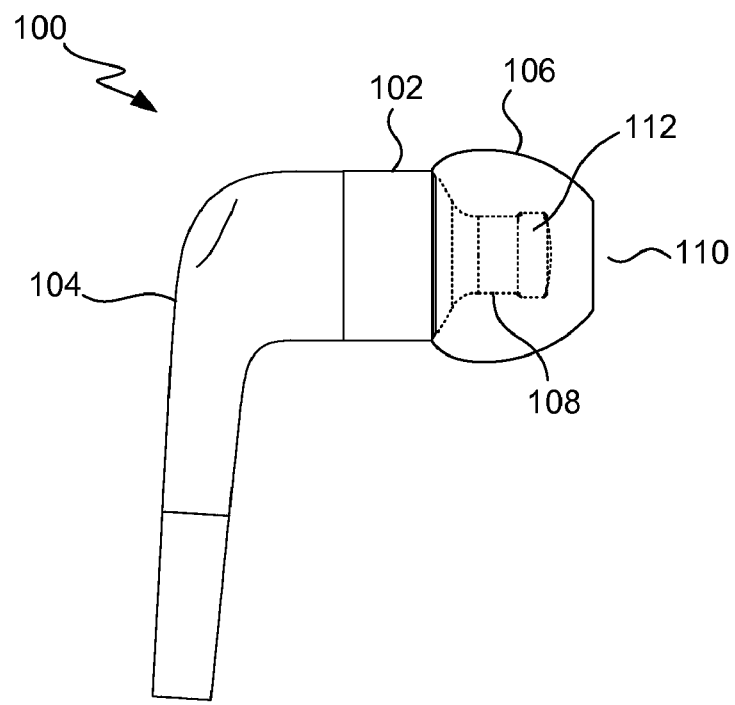
FIGS. 1A-1B are diagrams illustrating a headphone according to one embodiment of the invention.
Figure 1B:
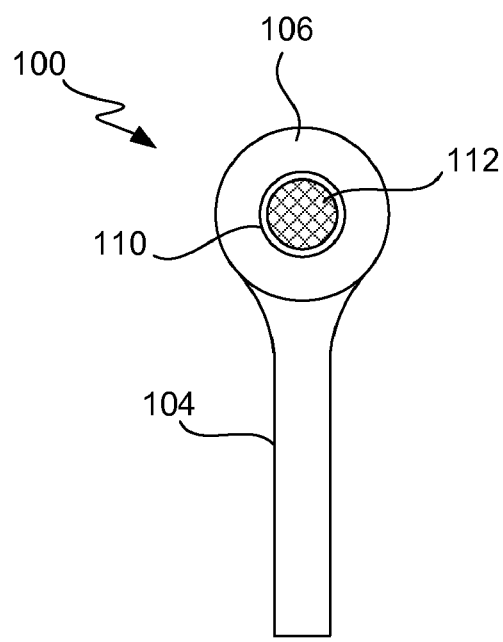

FIGS. 1A-1B are diagrams illustrating a headphone 100 according to one embodiment of the invention. FIG. 1A is a side view of the headphone 100, and FIG. 1B is a front view of the headphone 100. The headphone 100 can also be referred to as an earphone.

The headphone 100 includes a front body 102 and a rear body 104. The front body 102 is attached to the rear body 104. Alternatively, the front body 102 and rear body 104 can be formed as a unitary structure. The headphone 100 can also include an ear tip 106. The ear tip 106 is a deformable structure capable of conforming to a user's ear when being used by a user. The ear tip 106 can attach to a protruding portion 108 on the front body 102. Still further, as illustrated in FIG. 1B, the ear tip 106 can include an opening 110. The opening 110 exposes a cover 112 provided on a top end of the protruding portion 108 of the front body 102. As one example, the cover 112 can be a mesh cover, such as a screen (e.g., stainless steel screen). The top end of the protruding body 108 is adjacent the opening 110 in the ear tip 106. To provide audio sound for the user, the headphone 100 provides an acoustic channel internal to the front body 102. For proper output of quality audio sound from the headphone 100, the acoustic channel needs to remain substantially free from foreign matter that may collect in the acoustic channel. By providing the cover 110 at the top end of the protruding body 108, the cover 110 can serve to substantially prevent foreign matter, such as human debris (e.g., ear wax), from entering into the acoustic channel.

Figure 2A:
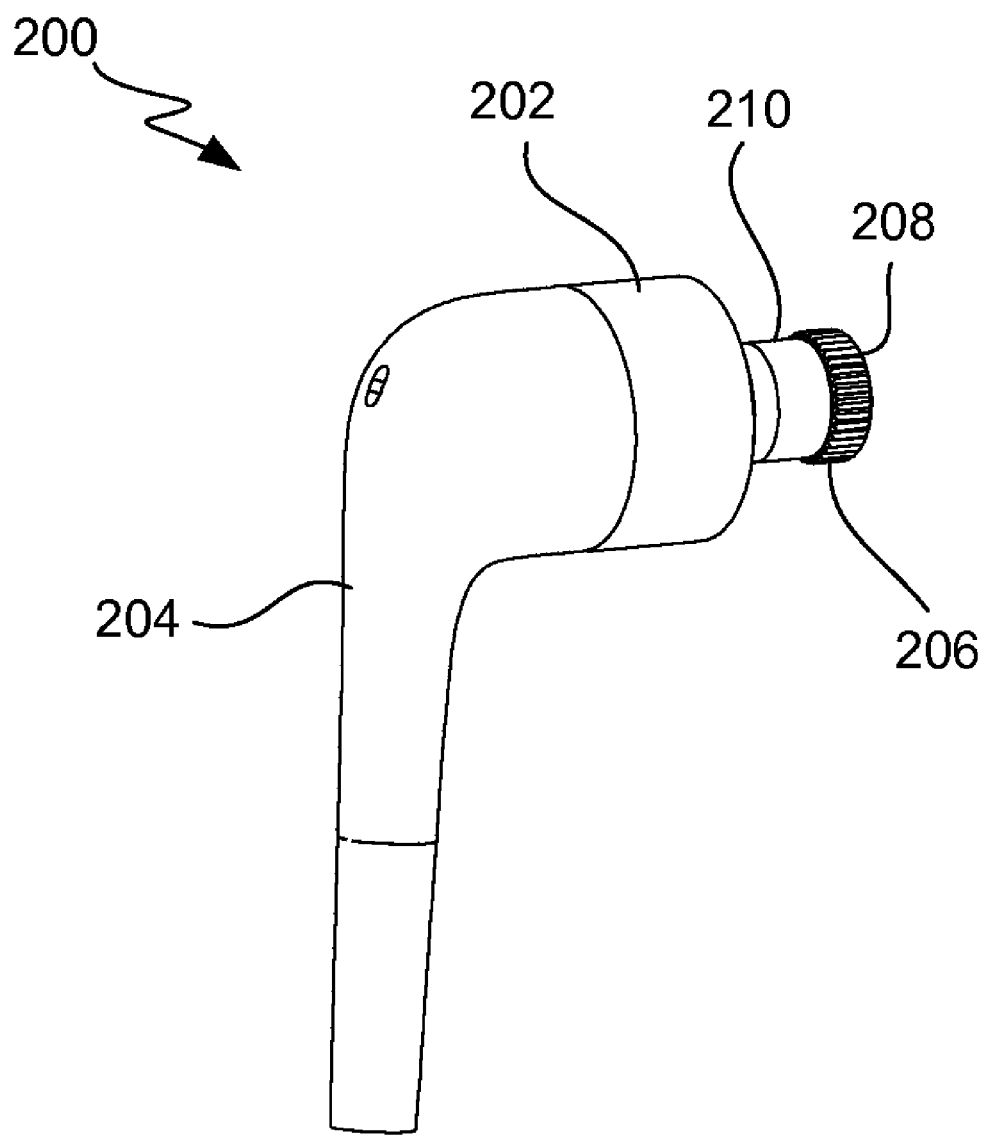
FIGS. 2A-2C are diagrams illustrating a headphone according to one embodiment of the invention.
Figure 2B:
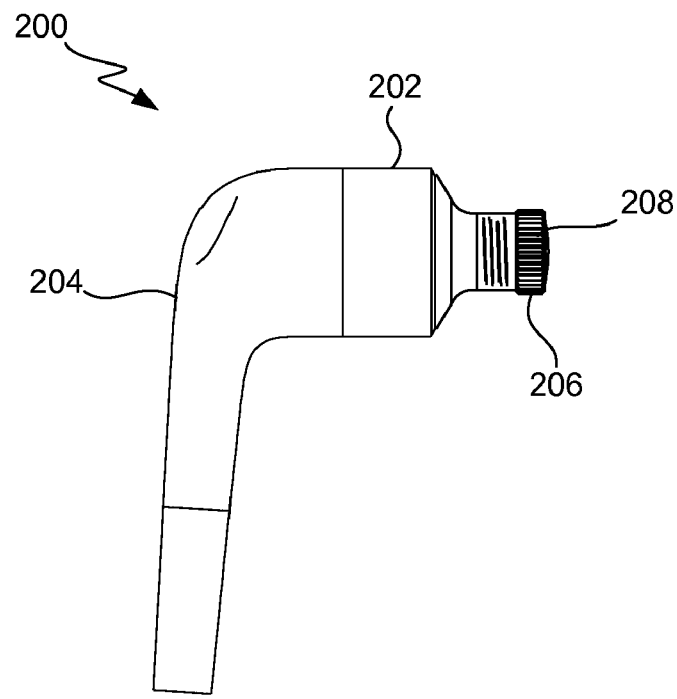
Figure 2C:
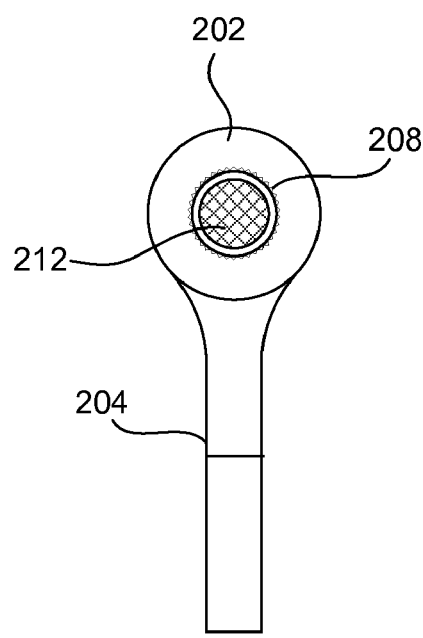

FIGS. 2A-2C are diagrams illustrating a headphone 200 according to one embodiment of the invention. FIG. 2A is a perspective view of the headphone 200, FIG. 2B is a side view of the headphone 200, and FIG. 2C is a front view of the headphone 200. The headphone 200 includes a front body 202 and a rear body 204. The front body 202 and the rear body 204 can be separately formed parts that can be assembled together to form a housing for the headphone 200. In one implementation, the front body 202 is secured to the rear body 204 by mechanical features, such as notches, detents, recesses, threads, or adhesives. In another implementation, the front body 202 and the rear body 204 can be formed as a unitary structure.

The front body 202 includes a removable cap 206. The removable cap 206 can include a plurality of the knurls 208. In this embodiment, it is intended that the removable cap 206 be removable from the headphone 200 by a user. Hence, the knurls 208, if provided, can assist the user with removal of the removable cap 206 from the headphone 200 or attachment of the removable cap 206 to the headphone 200. As shown in FIGS. 2A and 2B, the removable cap 206 can be removably attached to a top end of a protruding portion 210 of the front body 210.

The front body 202 encloses an acoustic channel that is used to provide sound to a user of the headphone 200. As such, acoustic channel extends through the center of the front body 202. Further, the removable cap 206 includes a central opening so that the sound being provided via the acoustic channel can emit from the headphone 200. As shown in FIG. 2C, the headphone 200 can also include a mesh cover 212 provided on or within the removable cap 206. Advantageously, the mesh cover 212 is placed at the end of the acoustic channel with respect to the front body 202. The mesh cover 212 is thereby able to substantially prevent foreign matter, such as human debris, from entering into the acoustic channel. If significant foreign matter is able to enter the acoustic channel, the acoustical characteristics and the ability for the headphone 200 to properly output sound to its user can be substantially hindered. Hence, the mesh cover 212 serves to substantially block foreign matter from entering the acoustic channel. If the mesh cover 212 becomes clogged, the removable cap 206 can be removed from the front body 202 and the mesh cover 212 can be serviced (e.g., cleaned to remove accumulated foreign debris).

The front body 202, the rear body 204, the removable cap 206 and the mesh cover 212 can be formed of the same or different materials (e.g., plastic, ceramic, metals, nylon, etc.). In one implementation, the rear body 204 can be plastic, and the front body 202, the removable cap 206 and the mesh cover 212 can be metal (e.g., stainless steel).

Figure 3:
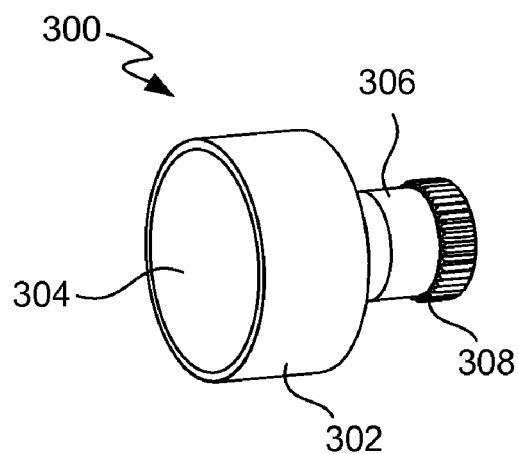
FIG. 3 is a perspective view of a front body according to one embodiment of the invention.

FIG. 3 is a perspective view of the front body 300 according to one embodiment of the invention. The front body 300 is, for example, suitable for use as the front body 202 illustrated in FIGS. 2A-2C.

The front body 300 includes a base portion 302 and an output portion 306. The base portion 302 can be integrally formed with the output portion 306. Alternatively, the base portion 302 and the output portion 306 can be separate parts that are assembled together to form the front body 300. A bottom end of the base portion 302 includes an opening 304. The opening 304 allows the front body 300 to be attached to a rear body, such as the rear body 104 illustrated in FIGS. 1A and 1B or the rear body 204 illustrated in the FIGS. 2A-2C. In addition, the front body 300 can include a removable cap 308. The removable cap 308 can attach to the output portion 306. As shown in FIG. 3, the removable cap 308 is able to be attached to a top end of the output portion 306.

Figure 4:
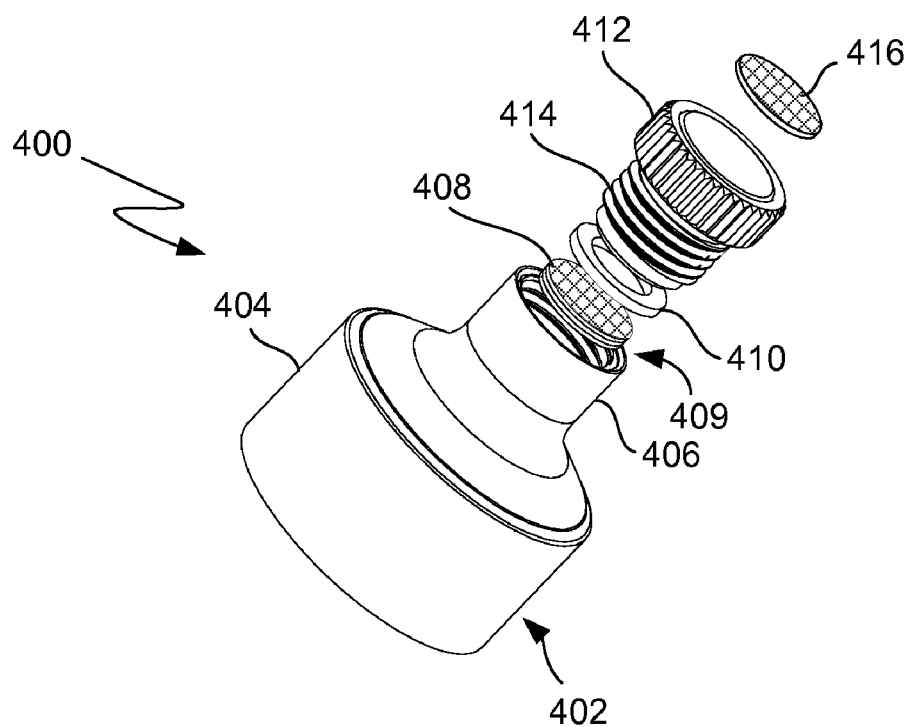
FIG. 4 is a perspective assembly diagram for a front body assembly according to one embodiment of the invention.

FIG. 4 is a perspective assembly diagram for a front body assembly 400 according to one embodiment of the invention. The front body assembly 400, once assembled, can pertain to the front body 700 illustrated in FIG. 3.

The front body assembly 400 includes a front body 402. The front body 402 includes a base portion 404 and an output portion 406. The output portion 406 can correspond to a protruding portion of the front body 402. As illustrated in FIG. 4, at the end of the protruding portion of the output portion 406, various components can be inserted in or attached to the output portion 406. Specifically, as shown in FIG. 4, an internal mesh 408 can be placed internal to an opening 409 of the output portion 406. In addition, an internal gasket 410 can be placed within the opening 409 of the output portion 406. The output portion 406 can also receive a cap body 412. In one embodiment, the cap body 412 includes threads 414. The opening 409 in the output portion 406 can also include threads. In such case, the cap body 412 can be screwed into the opening 409 in the output portion 406. When the cap body is screwed into the opening 409 in the output portion 406, the internal gasket 410 can serve to further secure the cap body 412 within the opening 409 of the output portion 406. The internal gasket 410 can provide a compliant surface that can be compressed when the cap body 412 is screwed completely into the opening in the output portion 406. The internal mesh 408 can be secured within the opening 409 in the output portion 406 by adhesive and/or by the internal gasket 410. The internal gasket 410 can be sized such that even with the cap body 412 removed from the opening 409 in the output portion 406, the internal mesh 408 remains secured in the opening 409. However, should the internal mesh 408 need to be removed, the internal gasket 410 is conformable such that it can be removed from the opening 409 thereby allowing the internal mesh 408 to also be removed for servicing. The front body assembly 400 can also includes an outer mesh 416. The outer mesh 416 can be secured to a top surface of the cap body 412.

Although the internal mesh 408 and the outer mesh 416 are utilized, the acoustic channel provided through the opening 409 in the output portion 406 is not blocked by any of the components of the front body assembly 400 being inserted or coupled to the output portion 406. In this regard, the internal gasket 410 is ring-shaped, and the cap body 412 is hollow or tubular. Further, the internal mesh 408 and the outer mesh 416 include numerous openings within the mesh structures that allow sound from the acoustic channel to properly emit from the front body assembly 400. In other words, the internal mesh 408 and the outer mesh 416 are substantially acoustically neutral.

The parts of the front body assembly 400 can be formed of different materials (e.g., plastic, ceramic, metals, nylon, etc.). In one implementation, the front body 402 can be metal, the internal mesh 408 can be metal, the internal gasket 410 can be rubber, the cap body 412 can be metal, and the outer mesh 416 can be metal. As one example, the metal can be stainless steel.

Figure 5:
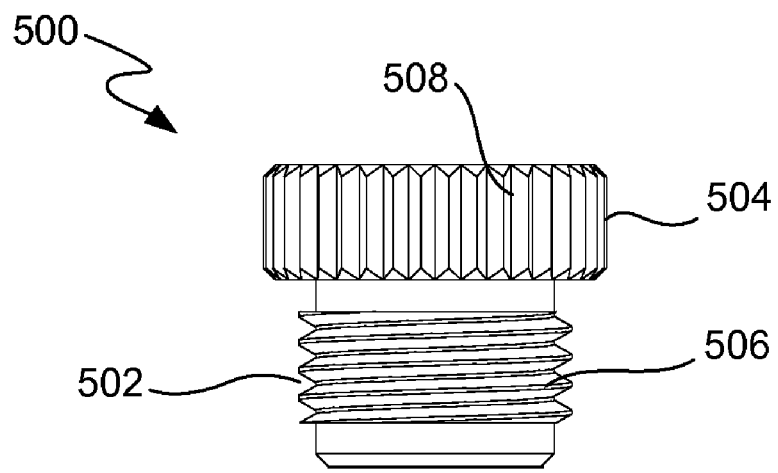
FIG. 5 is a side view of a cap body according to one embodiment of the invention.

FIG. 5 is a side view of a cap body 500 according to one embodiment of the invention. The cap body 500 includes a bottom portion 502 and a top portion 504. In the bottom portion 502 includes threads 506. The top portion 504 includes knurls 508.

Figure 6:
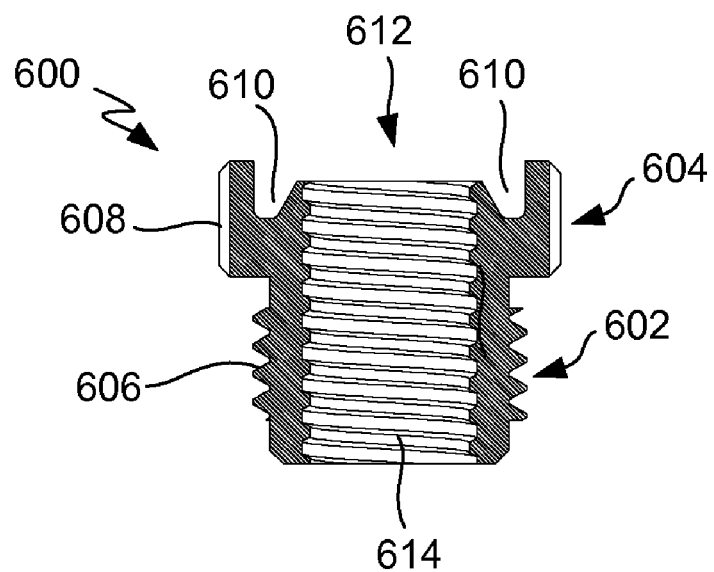
FIG. 6 is a cross-sectional view of a cap body according to one embodiment of the invention.

FIG. 6 is a cross-sectional view of a cap body 600 according to one embodiment of the invention. The cap body 600 includes a bottom portion 602 and a top portion 604. The bottom portion 602 has external threads 606. The top portion 604 includes knurls 608 about the periphery of the top portion 604. In addition, the cap body 600 includes a recess region 610 for receiving a cover, such as a mesh cover. Additionally, the cap body 600 has an opening 612 that extends therethrough. The opening 612 couples to, extends to or is part of the acoustic channel for a front body (e.g., cap body 402) to which the cap body 600 is attached. The opening 612 internal to the cap body 600 can further include internal threads 614. The internal threads 614 do not serve a mechanical purpose but have been shown to have beneficial acoustic impact on acoustical characteristics of the acoustic channel.

Figure 7:
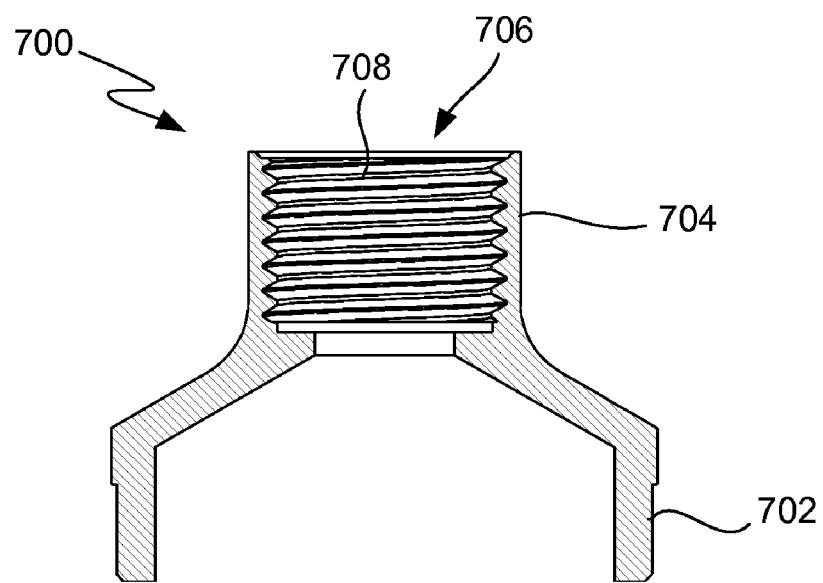
FIG. 7 is a cross-sectional view of an output portion of a front body according to one embodiment of the invention.

FIG. 7 is a cross-sectional view of an output portion 700 of a front body according to one embodiment of the invention.

The output portion 700 includes a tapered structure 702 and an output structure 704. A central portion of the output portion 700 extends an opening 706 which provides an acoustic channel through the output portion 700. Internal to the output structure 704 are threads 708 for receiving compatible threads of a removable cap (e.g., cap body 412, 500, 600). Although the output portion 700 utilizes threads 708 to secure a removable cap to the output portion 700, it should be recognized that in other embodiments different techniques can be utilized to secure a removable cap to the output portion 700.

Figure 8:
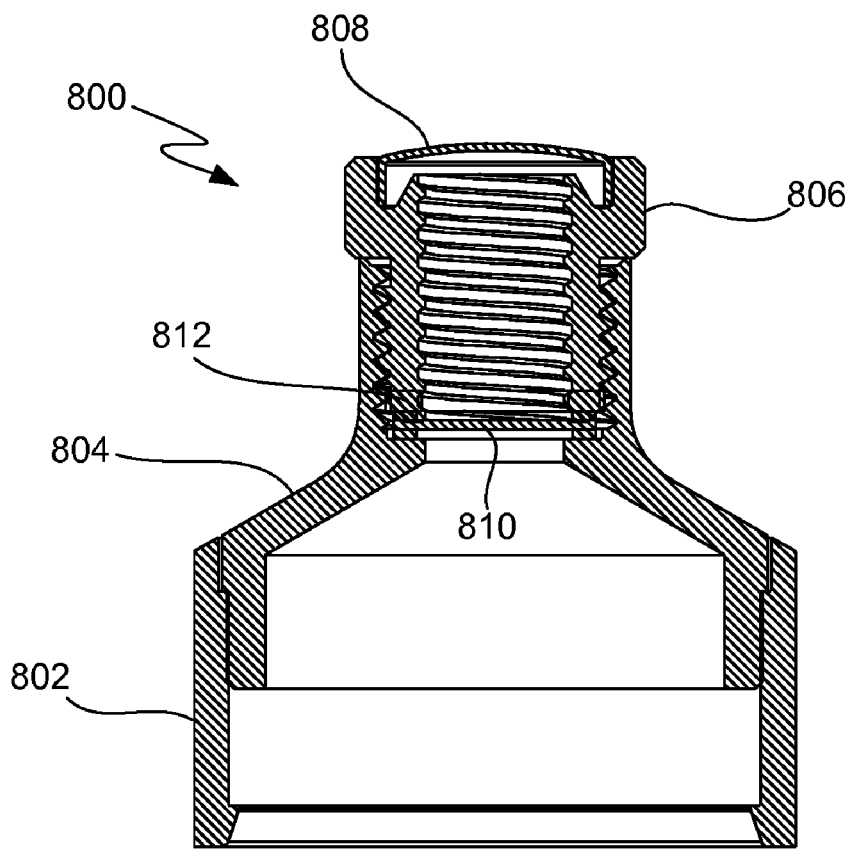
FIG. 8 is a cross-sectional view of a front body according to one embodiment of the invention.

FIG. 8 is a cross-sectional view of a front body 800 according to one embodiment of the invention. As illustrated in FIG. 8, the front body 800 is fully assembled. Initially, it is noted that the front body 800 includes a base portion 802. The base portion 802 serves to connect to a rear body of a headphone (e.g., rear body 104, 204). The front body 800 also includes an output portion 804. The output portion 804 is, for example, constructed as is the output portion 700 illustrated in FIG. 7. Additionally, a removable cap 806 has been attached to the output portion 804. In particular, the removable 806 has been screwed into the threaded opening in a top end of the output portion 804. The removable cap 806 can have an outer mesh 808 secured to a top end of the removable cap 806. The outer mesh 808 can be secured to the top end of the removable cap 806 by interference (frictional) fitting, adhesive, notches, protrusions, and the like. Additionally, an internal mesh 810 and a gasket 812 can be provided within the threaded opening of the output portion 804. As illustrated in FIG. 8, the gasket 812 can be provided in the opening of the output portion 804 between the internal mesh 810 and a forward end of the removable cap 806 while inserted. When the removable cap 806 is screwed into the threaded opening of the output portion 804, the gasket 812 can be compressed, which thereby serves to prevent the removable cap 806 from loosening. Hence, the gasket 812 can be considered as a retention device for the removable cap 806.

According to another aspect, the invention can pertain to an ear tip for use with a headphone. The ear tip can include a deformable outer member and is suitable for in-ear operation. The deformable outer member enables the ear tip to readily conform to a user's ear. The ear tip can also include an inner member to structurally support the outer member and to facilitate attachment to a headphone.

The ear tip can, for example, be used with the headphones discussed above. For example, the ear tip can be removably attached to a headphone such as illustrated in FIG. 1A. In one embodiment, the ear tips are soft and deformable. The ear tips can be used in-ear. Since the ear tips can readily deform, the ear tips can operate to substantially seal against a user's ear. For increased comfort, the ear tips can be provided in different sizes to accommodate variation in user ear sizes. The color and translucency of the ear tips can also vary. In addition, the materials used to form ear tips may vary.

An ear tip can be formed from an elastomer, which is a polymer with the property of elasticity. For example, the ear tip can be formed, in whole or in part, of silicone or silicone rubber. Generally, an ear tip may be formed from any suitable material which is capable of providing a seal with a surface of a human ear. An ear tip may be formed from materials including, but not limited to including, polyurethane (PU) foam, PU foam with a silicone skin, silicone gel with a silicone rubber skin, PU foam with a PU skin, silicone foam, or a thermoplastic (TPE) foam. In one embodiment, any relatively slow-rebounding material which may be deformed and then expand to conform to an original geometry may be used to form at least part of an ear tip.

Materials used to form an ear tip may also be treated to improve durability and/or cosmetic appearance. By way of example, PU foam may be chemically treated to reduce the number of visible surface pores and surface wrinkles. Alternatively, an outer later of material can be provided over the PU form to provide desired characteristics. In one embodiment, a silicone skin can be formed in a desired configuration for an ear tip and then an internally cavity can be filled with PU or PU foam. In another embodiment, a PU foam may have a silicone skin molded thereon, sprayed thereon, or otherwise applied thereon to provide a smooth cosmetic appearance. Hence, a cosmetic appearance may be created by treating a material from which an ear tip is formed, or a cosmetic appearance may be created by providing a layer, e.g., a layer of cosmetically appealing material, over the material from which an ear tip is formed.

Figure 9A:
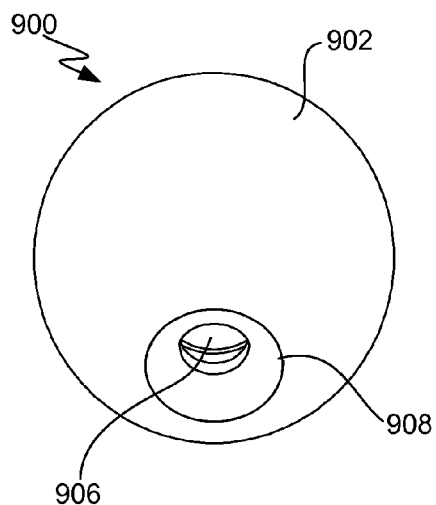
FIGS. 9A-9E are views of an ear tip according to one embodiment of the invention.
Figure 9B:
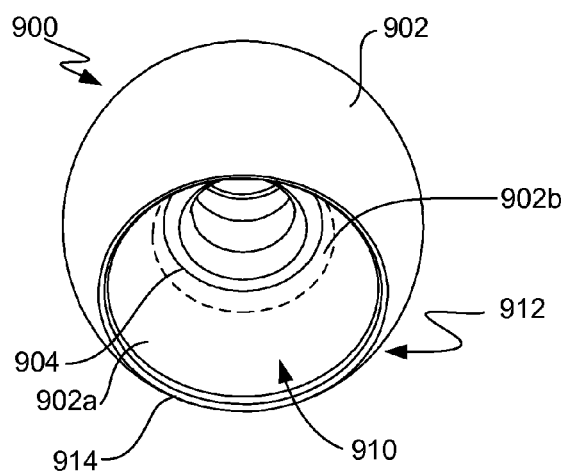
Figure 9C:
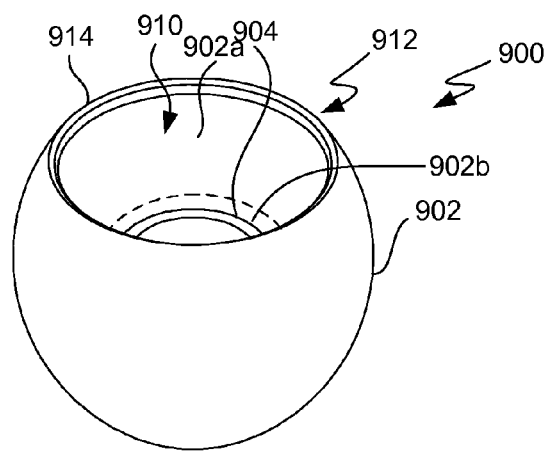

FIGS. 9A-9E are views of an ear tip 900 according to one embodiment of the invention. FIG. 9A is a front perspective view of the ear tip 900, FIG. 9B is a rear perspective view of the ear tip 900, and FIG. 9C is a side perspective view of the ear tip 900.

The ear tip 900 includes an outer structure 902 and an inner structure 904. The ear tip 900 also has a top opening 906 provided at a front surface 908 of the ear tip 900. The top opening 906 serves as an opening for audio sound (emitted from a headphone) to be directed into a user's ear canal. The ear phone 900 also has a bottom opening 910 at a rear surface 912. At the rear surface 912, a bottom edge 914 is provided around the bottom opening 910.

The inner structure 904 is covered by the outer structure 902. The outer structure 902 is adhered to or integral with the inner structure 904 at the front surface 908. The outer structure 902 extends over and around the inner structure 902 but remains open at the bottom opening 910 at the rear surface 912. Behind the front surface 908, the outer structure 902 may be spaced apart from the inner structure 904.

Alternatively, the outer structure 902 may be formed from a membrane component 902a and a solid component 902b. The solid component 902a is arranged to be a slow-rebounding component that expands and conforms to a shape, e.g., a shape of an ear cavity in which the ear tip 900 is inserted, after being compressed. Outer structure 902 may be readily deformed, as for example by pressure applied using fingers. For example, in use, the ear tip 900 will be inserted into or adjacent a user's ear canal and the outer structure 902 can readily deform to substantially seal against a user's ear. In particular, the solid component 902b may deform to substantially seal against a user's ear.

In one embodiment, the outer structure 902 can include a cosmetic surface, which can be the exterior surface of the outer structure 902. The cosmetic surface may be, in one embodiment, a silicone skin that is substantially bonded to an underlying material such as silicone gel, silicone foam, or PU foam. Hence, the outer structure 902 may include a first pliable material that may conform to the shape of an ear cavity, as well as a second pliable material that essentially forms a cosmetic surface. The second pliable material may cooperate with the first pliable material to conform to the shape of an ear cavity. In one embodiment, the outer structure 902 may effectively include two layers, namely a structural layer and a cosmetic layer.

Membrane component 902a may be deformed, and is formed from substantially the same material, or materials, used to form solid component 902b. Membrane component 902a is arranged such that while outer structure 902 forms a substantially undercut sphere with a "filled" portion, where solid component 902b is effectively the filled portion, membrane component 902a forms an "unfilled" portion such that an air may effectively fill portions of outer structure 902.

Figure 9D:
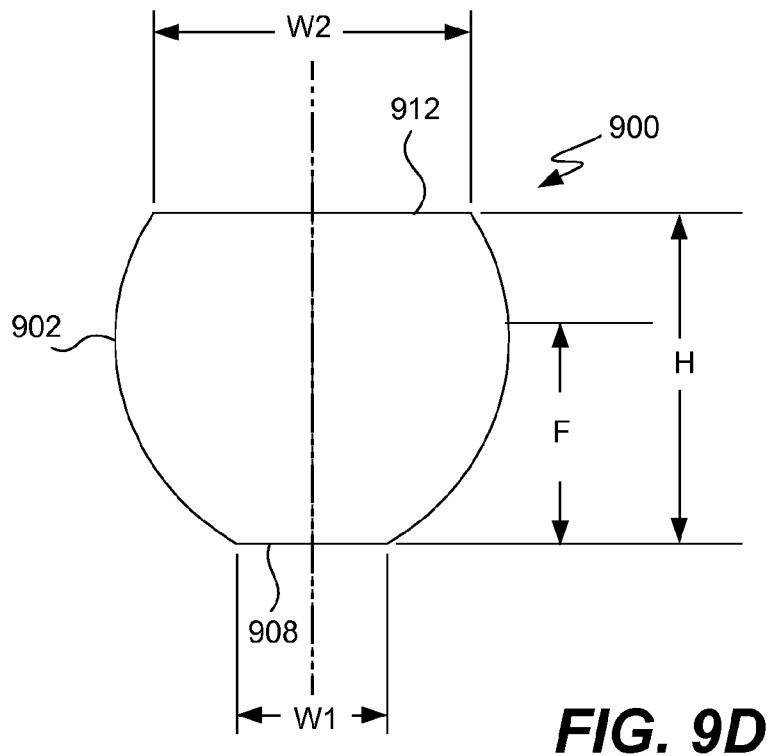

FIG. 9D is a side view of the ear tip 900 according to one embodiment of the invention. The configuration of the outer structure 902 according to one embodiment of the invention is illustrated in FIG. 9D. According to the embodiment illustrated in FIG. 9D, the ear tip 900 can have a height (H) of 10.48 mm, the width (W1) (diameter) of the front surface 908 can be 4.75 mm, the width (W2) (diameter) of the rear surface 912 can be 10.01 mm. A fill height (F), which corresponds to a height of the solid component 902b of outer structure 902 is generally less than the height (H). The fill height (F) may extend slightly above the widest portion of ear tip 900, as shown, although it should be appreciated that the fill height (F) may generally be any height that is less than the height (H).

Figure 9E:
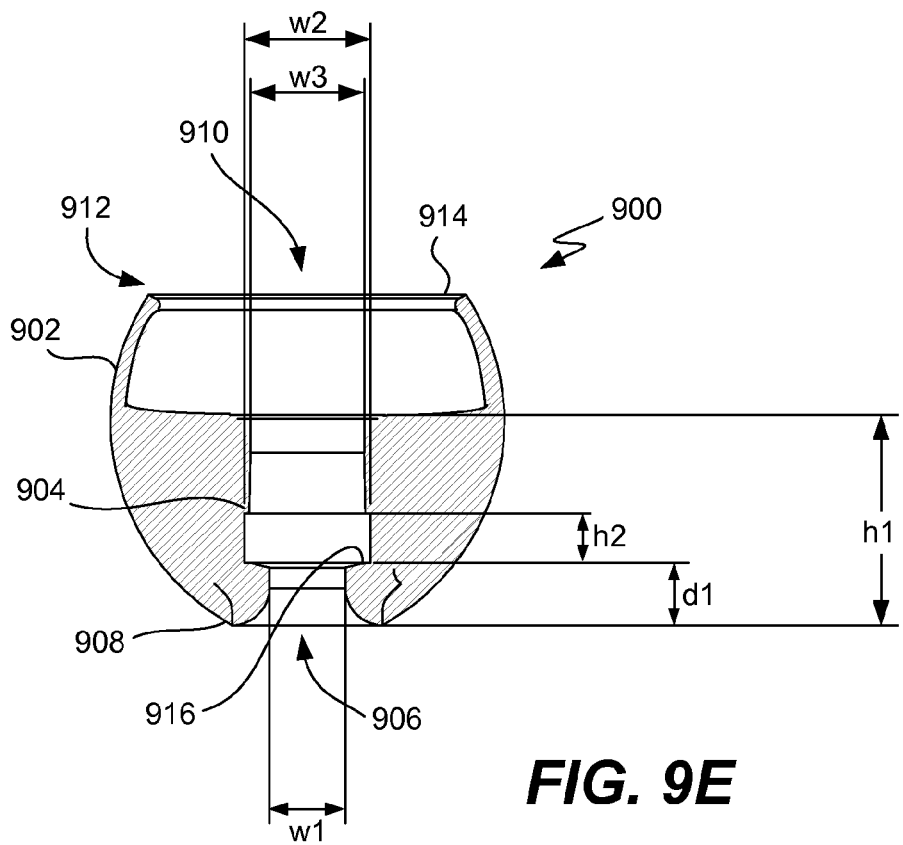

FIG. 9E is a cross-sectional view of the ear tip 900 according to one embodiment of the invention. The configuration of the inner structure 904 according to one embodiment of the invention is illustrated in FIG. 9E. The inner structure 904 can be cylindrical, so as to have a tubular configuration. The top of the inner structure 904 adheres to or is integral with the top region of the outer structure 902 at the front surface 908. Additionally, the internal configuration of the inner structure 904 can include one or more attachment features 916 that facilitates attachment of the inner structure 904 of the ear tip to a headphone. For example, the internal configuration of the inner structure 904 includes at least one recess that can serve as an attachment feature 916. According to the embodiment illustrated in FIG. 9E, the inner structure 904 can have a total height (h1) of 6.66 mm, a distance d1 from the front surface 908 to the start of the attachment feature 916 is 2.00 mm, the height (h2) of the attachment feature 916 (recess) is 1.55 mm, the width (w1) (diameter) of the top opening 906 is 2.40 mm, the width (w2) at the attachment feature 916 is 3.99 mm, and the width (w3) at the lower portion of the inner structure 904 is 3.61 mm. The fill height (F), as shown in FIG. 9D, may be greater than or approximately equal to the total height (h1). In one embodiment, the solid component 902b may be configured such that the fill height (F) that is approximately equal to the total height (h1) where the solid component 902b substantially contacts the internal structure 904, and have a larger fill height (F) at an interface with the membrane component 902a.

In one embodiment, the hardness of the inner structure 904 and the outer structure 902 are configured differently. For example, the inner structure 904 can have a greater hardness that the outer structure 902. In other words, in such an example, the outer structure 902 can be softer than the inner structure 904.

Durometer is one of several ways to indicate the hardness of a material, defined as the material's resistance to permanent indentation. The term durometer is often used to refer to the measurement, as well as the instrument itself. Durometer is typically used as a measure of hardness in polymers, elastomers and rubbers. In one implementation, according to a durometer measurement, the durometer of the inner structure 904 can be sixty (60), and the durometer of the outer structure 902 can be forty (40).

Figure 10A:
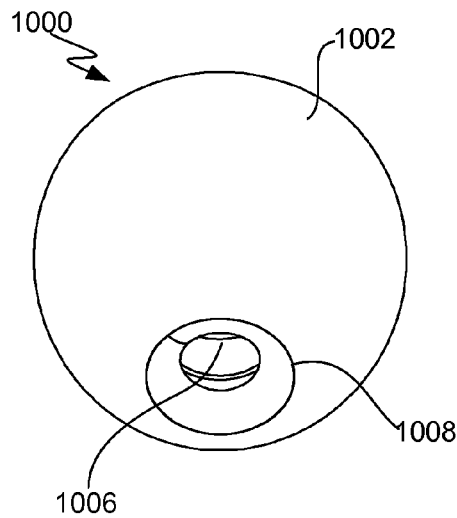
FIGS. 10A-10E are views of an ear tip according to another embodiment of the invention.
Figure 10B:
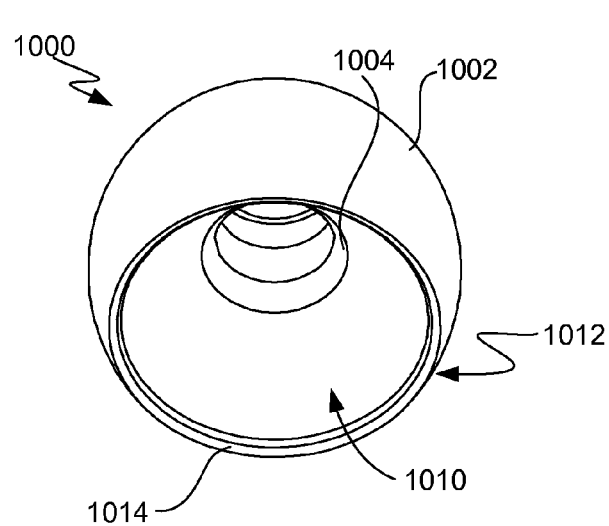
Figure 10C:
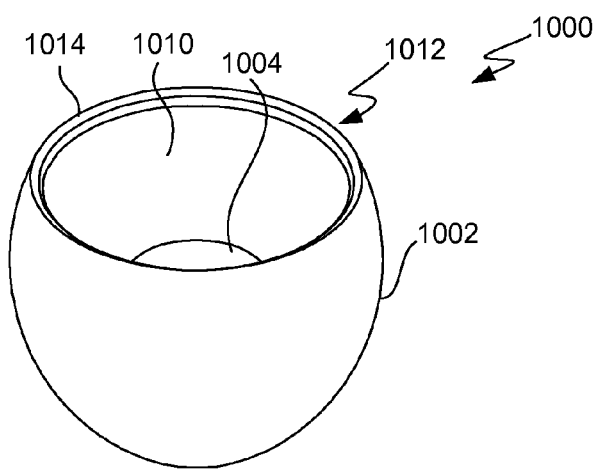

FIGS. 10A-10E are views of an ear tip 1000 according to one embodiment of the invention. FIGS. 10A-10E are views of an ear tip 1000 according to one embodiment of the invention. FIG. 10A is a front perspective view of the ear tip 1000, FIG. 10B is a rear perspective view of the ear tip 1000, and FIG. 10C is a side perspective view of the ear tip 1000. The ear tip 1000 is smaller than the ear tip 900 illustrated in FIGS. 9A-9E.

The ear tip 1000 includes an outer structure 1002 and an inner structure 1004. The ear tip 1000 also has a top opening 1006 provided at a front surface 1008 of the ear tip 1000. The top opening 1006 serves as an opening for audio sound (emitted from a headphone) to be directed into a user's ear canal. The ear phone 1000 also has a bottom opening 1010 at a rear surface 1012. At the rear surface 1012, a bottom edge 1014 is provided around the bottom opening 1010.

The inner structure 1004 in contact with the outer structure 1002. The outer structure 1002 is adhered to or integral with the inner structure 1004 at the front surface 1008, and substantially along side surfaces of inner structure 1004. The outer structure is arranged to be readily deformed. For example, in use, the ear tip 1000 will be inserted into or adjacent a user's ear canal and the outer structure 1002 can readily deform to substantially seal against a user's ear.

Figure 10D:
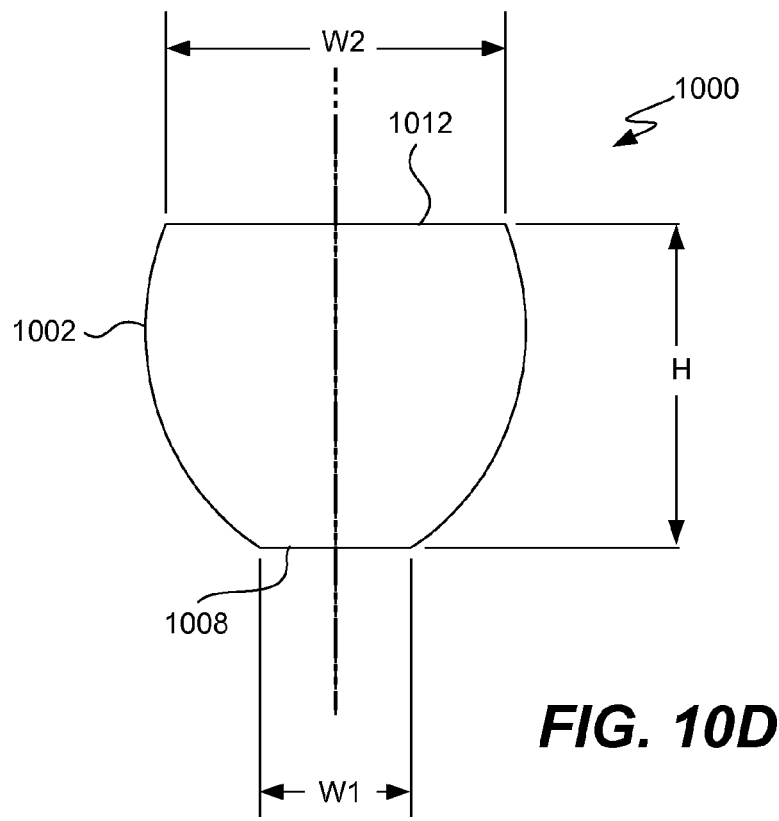

FIG. 10D is a side view of the ear tip 1000 according to one embodiment of the invention. The configuration of the outer structure 1002 according to one embodiment of the invention is illustrated in FIG. 10D. According to the embodiment illustrated in FIG. 10D, the ear tip 1000 can have a height (H) of 9.58 mm, the width (W1) (diameter) of the front surface 1008 can be 4.48 mm, the width (W2) (diameter) of the rear surface 1012 can be 10.01 mm.

Figure 10E:
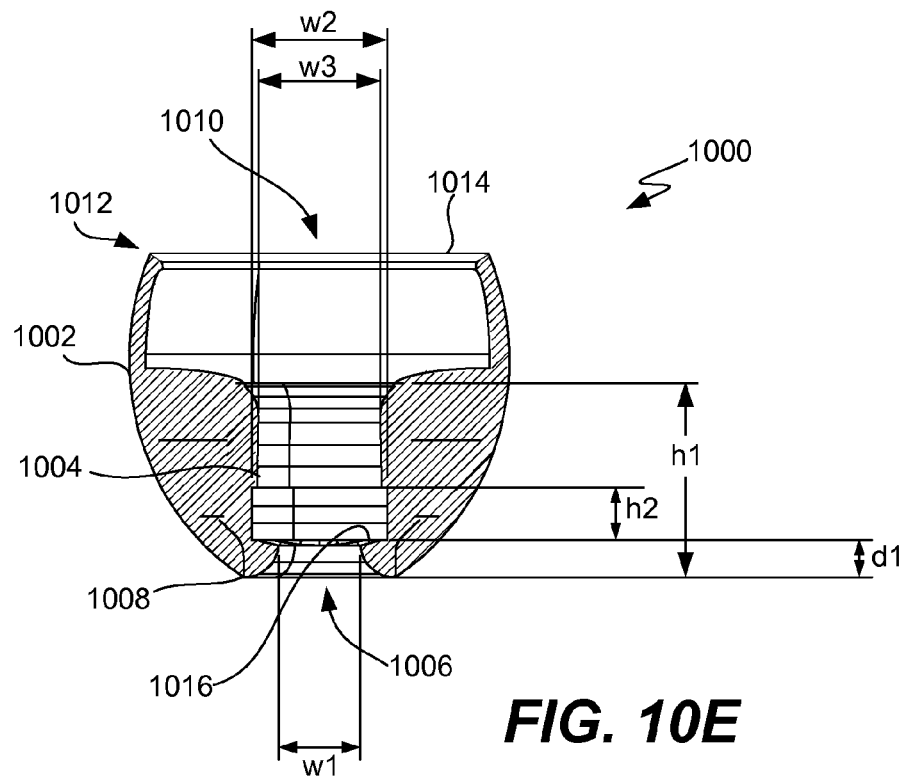

FIG. 10E is a cross-sectional view of the ear tip 1000 according to one embodiment of the invention. The configuration of the inner structure 1004 according to one embodiment of the invention is illustrated in FIG. 10E. The inner structure 1004 can be cylindrical, so as to have a tubular configuration. The top of the inner structure 1004 adheres to or is integral with the top region of the outer structure 1002 at the front surface 1008. The sides of the inner structure 1004 also adhere to the outer structure 1002. Additionally, the internal configuration of the inner structure 1004 can include one or more attachment features 1016 that facilitates attachment of the inner structure 1004 of the ear tip to a headphone. For example, the internal configuration of the inner structure 1004 includes at least one recess that can serve as an attachment feature 1016. According to the embodiment illustrated in FIG. 10E, the inner structure 1004 can have a total height (h1) of 5.76 mm, a distance d1 from the front surface 1008 to the start of the attachment feature 1016 is 1.10 mm, the height (h2) of the attachment feature 1016 (recess) is 1.55 mm, the width (w1) (diameter) of the top opening 1006 is 2.41 mm, the width (w2) at the attachment feature 1016 is 3.99 mm, and the width (w3) at the lower portion of the inner structure 1004 is 3.61 mm.

In one embodiment, the hardness of the inner structure 1004 and the outer structure 1002 are configured differently. For example, the inner structure 1004 can have a greater hardness that the outer structure 1002. In other words, in such an example, the outer structure 1002 can be softer than the inner structure 1004. The outer structure 1002 may be formed from a deformable material, such as a slow-rebounding material. In one implementation, according to a durometer measurement, the durometer of the inner structure 1004 can be about fifty (50), and the durometer of the outer structure 1002 can be about thirty (30).

Figure 11A:
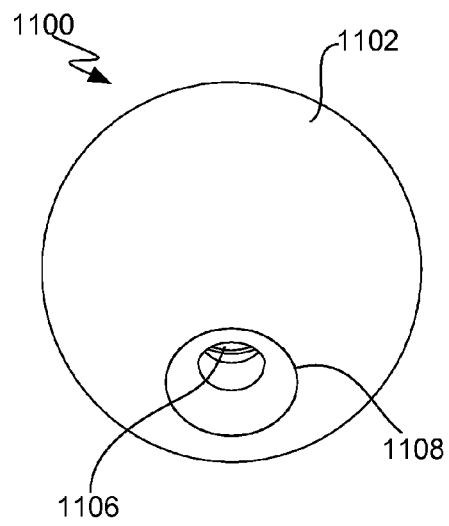
FIGS. 11A-11E are views of an ear tip according to still another embodiment of the invention.
Figure 11B:
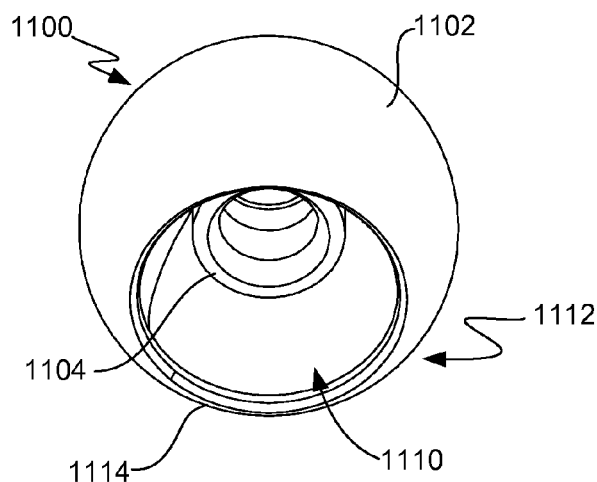
Figure 11C:
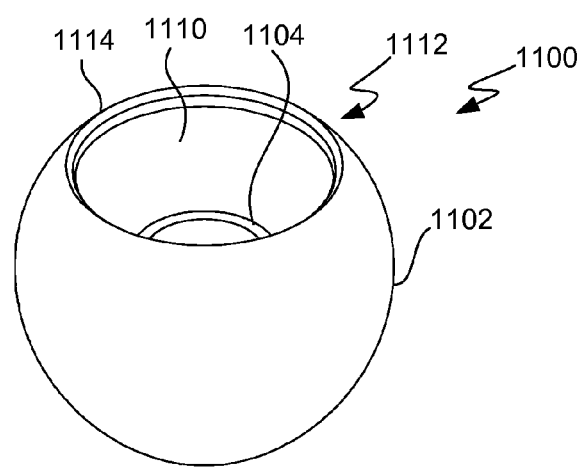

FIGS. 11A-11E are views of an ear tip 1100 according to one embodiment of the invention. FIGS. 11A-11E are views of an ear tip 1100 according to one embodiment of the invention. FIG. 11A is a front perspective view of the ear tip 1100, FIG. 11B is a rear perspective view of the ear tip 1100, and FIG. 11C is a side perspective view of the ear tip 1100. The ear tip 1100 is larger than the ear tip 900 illustrated in FIGS. 9A-9E.

The ear tip 1100 includes an outer structure 1102 and an inner structure 1104. The ear tip 1100 also has a top opening 1106 provided at a front surface 1108 of the ear tip 1100. The top opening 1106 serves as an opening for audio sound (emitted from a headphone) to be directed into a user's ear canal. The ear tip 1100 also has a bottom opening 1110 at a rear surface 1112. At the rear surface 1112, a bottom edge 1114 is provided around the bottom opening 1110.

The inner structure 1104 is in contact with the outer structure 1102. The outer structure 1102 is adhered to or integral with the inner structure 1104 at the front surface 1108, as well as along the sides of inner structure 1104. The outer structure 1102 extends around the inner structure 1102 but remains substantially open at the bottom opening 1110 at the rear surface 1112. In use, the ear tip 1100 will be inserted into or adjacent a user's ear canal and the outer structure 1102 can readily deform to substantially seal against a user's ear.

Figure 11D:
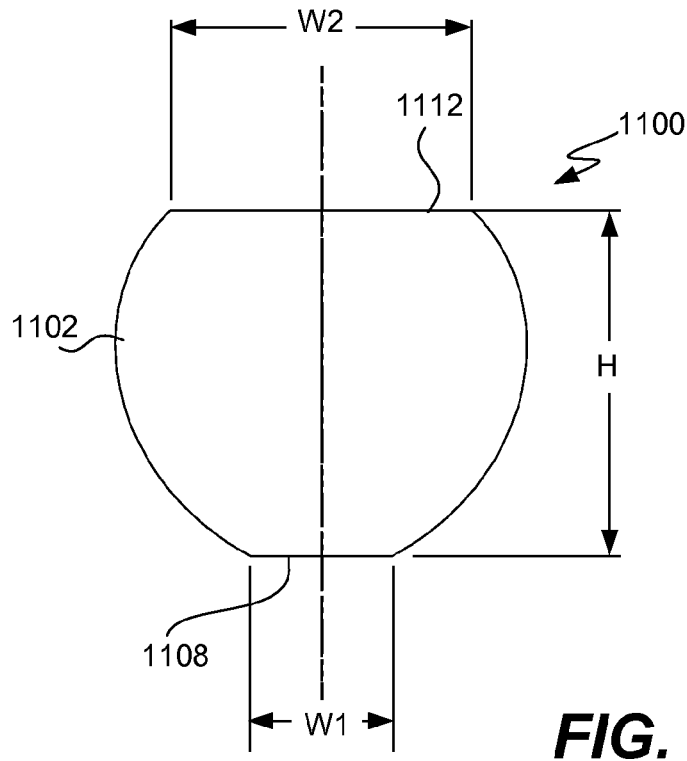

FIG. 11D is a side view of the ear tip 1100 according to one embodiment of the invention. The configuration of the outer structure 1102 according to one embodiment of the invention is illustrated in FIG. 11D. According to the embodiment illustrated in FIG. 11D, the ear tip 1100 can have a height (H) of 11.53 mm, the width (W1) (diameter) of the front surface 1108 can be 4.76 mm, the width (W2) (diameter) of the rear surface 1112 can be 10.01 mm.

Figure 11E:
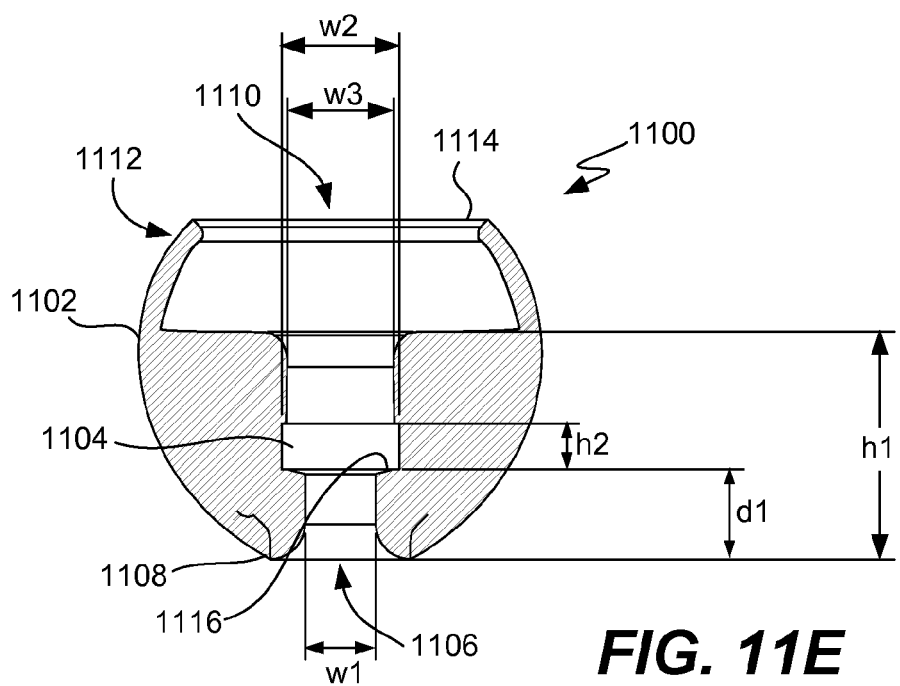

FIG. 11E is a cross-sectional view of the ear tip 1100 according to one embodiment of the invention. The configuration of the inner structure 1104 according to one embodiment of the invention is illustrated in FIG. 11E. The inner structure 1104 can be cylindrical, so as to have a tubular configuration. The top of the inner structure 1104 may adhere to or may be integral with the top region of the outer structure 1102 at the front surface 1108. Additionally, the internal configuration of the inner structure 1104 can include one or more attachment features 1116 that facilitates attachment of the inner structure 1104 of the ear tip to a headphone. For example, the internal configuration of the inner structure 1104 includes at least one recess that can serve as an attachment feature 1116. Sides of the inner structure 1104 may also be adhered to outer structure 1102. According to the embodiment illustrated in FIG. 11E, the inner structure 1104 can have a total height (h1) of 7.71 mm, a distance d1 from the front surface 1108 to the start of the attachment feature 1116 is 3.05 mm, the height (h2) of the attachment feature 1116 (recess) is 1.55 mm, the width (w1) (diameter) of the top opening 1106 is 2.40 mm, the width (w2) at the attachment feature 1116 is 3.99 mm, and the width (w3) at the lower portion of the inner structure 1104 is 3.61 mm.

In one embodiment, the hardness of the inner structure 1104 and the outer structure 1102 are configured differently. For example, the inner structure 1104 can have a greater hardness that the outer structure 1102. In other words, in such an example, the outer structure 1102 can be softer than the inner structure 1104. In one implementation, according to a durometer measurement, the durometer of the inner structure 1104 can be about sixty (60), and the durometer of the outer structure 1002 can be about forty (40).

Various materials used to form an ear tip may generally be processed to provide desirable aesthetic, or cosmetic, properties. For example, a PU foam with a relatively smooth exterior surface may be more pleasing to the eye than other PU foams. A relatively smooth exterior surface may be one with relatively few surface bubbles and/or relatively few wrinkles. To control the surface bubbles or, more generally, the pore size of the PU foam, the ratio of components of the PU foam may be changed. For example, the amount of silicon surfactants in the PU foam may be altered to substantially control the pore size associated with the PU foam.

In one embodiment, an inner structure of an ear tip may be formed from a solid PU, with PU foam overmolded onto the solid PU to form an outer structure. The PU foam may be treated to substantially minimize surface pores and wrinkles.

An ear tip may include an outer structure formed from a PU foam that is coated with a PU skin. Solid PU may be sprayed in a mold, for example, prior to filling the mold with PU foam, thereby resulting in a PU skin being formed on a PU structure. The PU skin may improve mechanical and chemical resistance, and also the cosmetic qualities of the ear tip.

A silicone skin or surface may be added to the surface of PU foam to improve the cosmetic qualities of an ear tip formed from the PU foam, as well as to enhance the durability of the PU foam. The silicone skin may be molded (e.g., over molded) onto the PU foam, or sprayed onto the PU foam. Alternatively, the PU form may be molded (e.g., over molded) onto the silicone skin. The silicone skin may also be applied by dipping the PU foam into silicone. A plasma or chemical process may be utilized to enable the silicone to effectively stick to the PU foam. A PU foam with a silicone skin generally has desirable chemical, mechanical, and environmental properties.

A relatively slow-rebounding ear tip may be formed from a silicone foam or gel that may be contained by a silicone rubber skin. Such a silicone rubber skin may be overmolded onto the silicone foam or gel. It should be appreciated that while the volume of PU foam can be pressed and then rebound, the volume of a silicone foam or gel may effectively be displaced. The silicone rubber skin may be provided for cosmetic purposes and/or for durability. In some instances, a silicone foam may also be used without a silicone rubber skin to form an ear tip.

Figure 12:
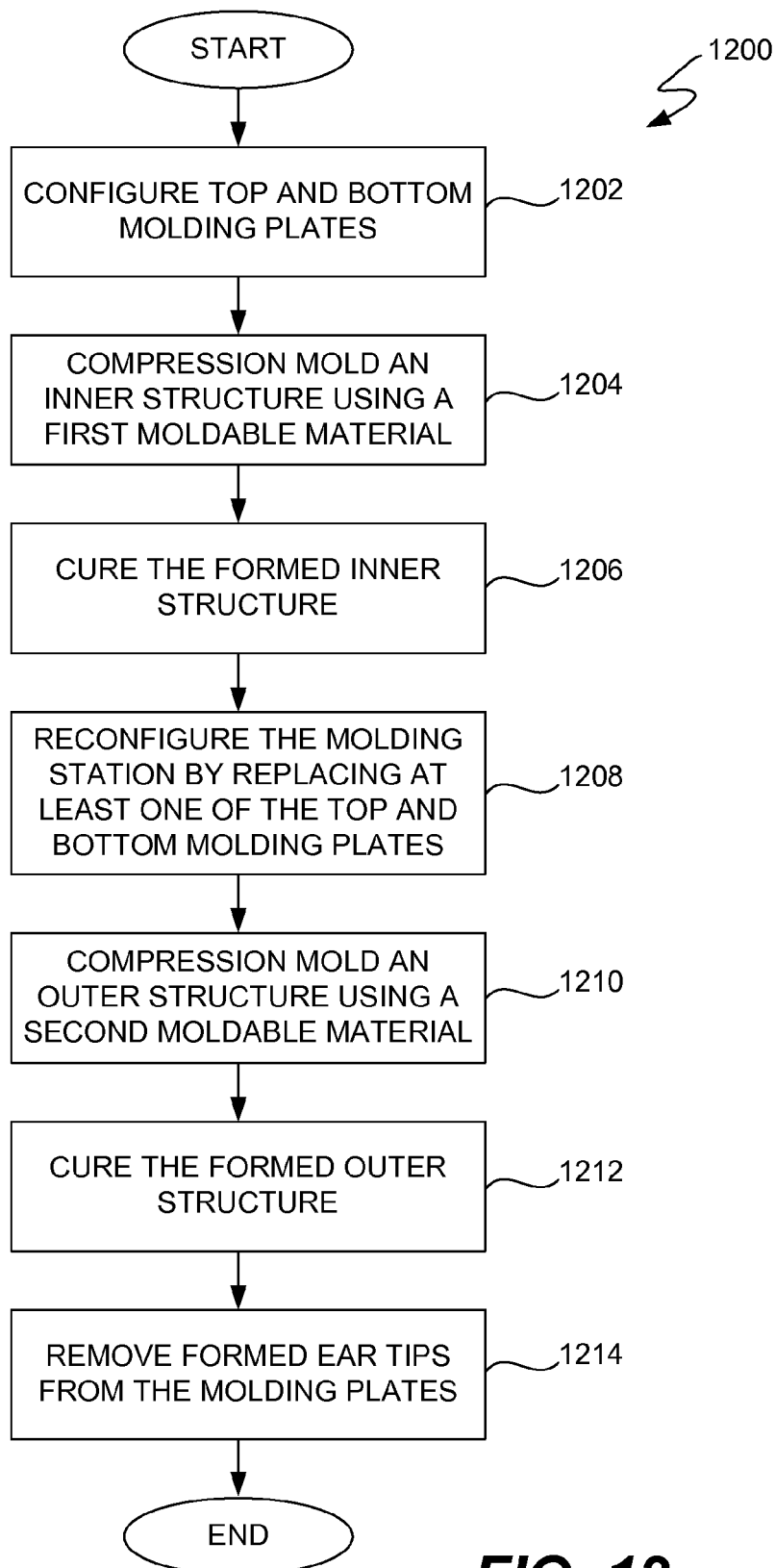
FIG. 12 is a flow diagram of an ear tip formation process according to one embodiment of the invention.

FIG. 12 is a flow diagram of an ear tip formation process 1200 according to one embodiment of the invention. The ear tip formation process 1200 can, for example, be used to form ear tips utilized by headphones. The ear tips being formed can, for example, be the ear tips 900, 1000 or 1100 illustrated in FIGS. 9A-11E.

The ear tip formation process 1200 can initially configure 1202 top and bottom molding plates. The molding plates are associated with a molding station (e.g., an injection molding station) of an assembly area. The molding plates can be custom formed for molding ear tips in accordance with the invention. The top and bottom molding plates can form a first mold. Next, an inner structure can be compression molded 1204 using a first moldable material injected into the first mold. As an example, the first mobile material can be silicone. Once molded, the formed inner structure can be cured 1206. The inner structure can be cured 1206 using radiation, such as heat or UV light, and/or time.

Next, the molding station can be reconfigured 1208 by replacing one of the top and bottom molding plates. The new combination of molding plates can form a second mold. For example, the top molding plate utilized in the molding of the inner structure can be removed and replaced with a different top molding plate. In this case, the new top molding plate facilitates creation of an outer structure. The top and bottom molding plates may be sprayed or otherwise coated, in one embodiment, with a silicone or PU material to facilitate the creation of an exterior skin on an outer structure. After the molding station has been reconfigured 1208, an outer structure can be compression molded 1210 using a second moldable material injected into the second mold. As an example, the second moldable material can also be silicone such as a silicone foam, or the second moldable material can be a PU foam or a TPE foam. In one embodiment, the deformability of the second moldable material is significantly greater than that of the first moldable material. When the outer structure is compression molded 1210 it is integrally formed onto an upper portion of the inner structure. Once molded, the formed outer structure can be cured 1212. The combination of the inner structure and the outer structure results in an ear tip. Since the molding plate typically forms a plurality of structures at one time, the ear tip formation process 1200 can concurrently produce a plurality of ear tips. After the formed outer structure has been cured 1212, the formed ear tip or tips can be removed 1214 from the molding plates. Following the block 1214, the ear tip formation process 1200 can end.

Figure 13:
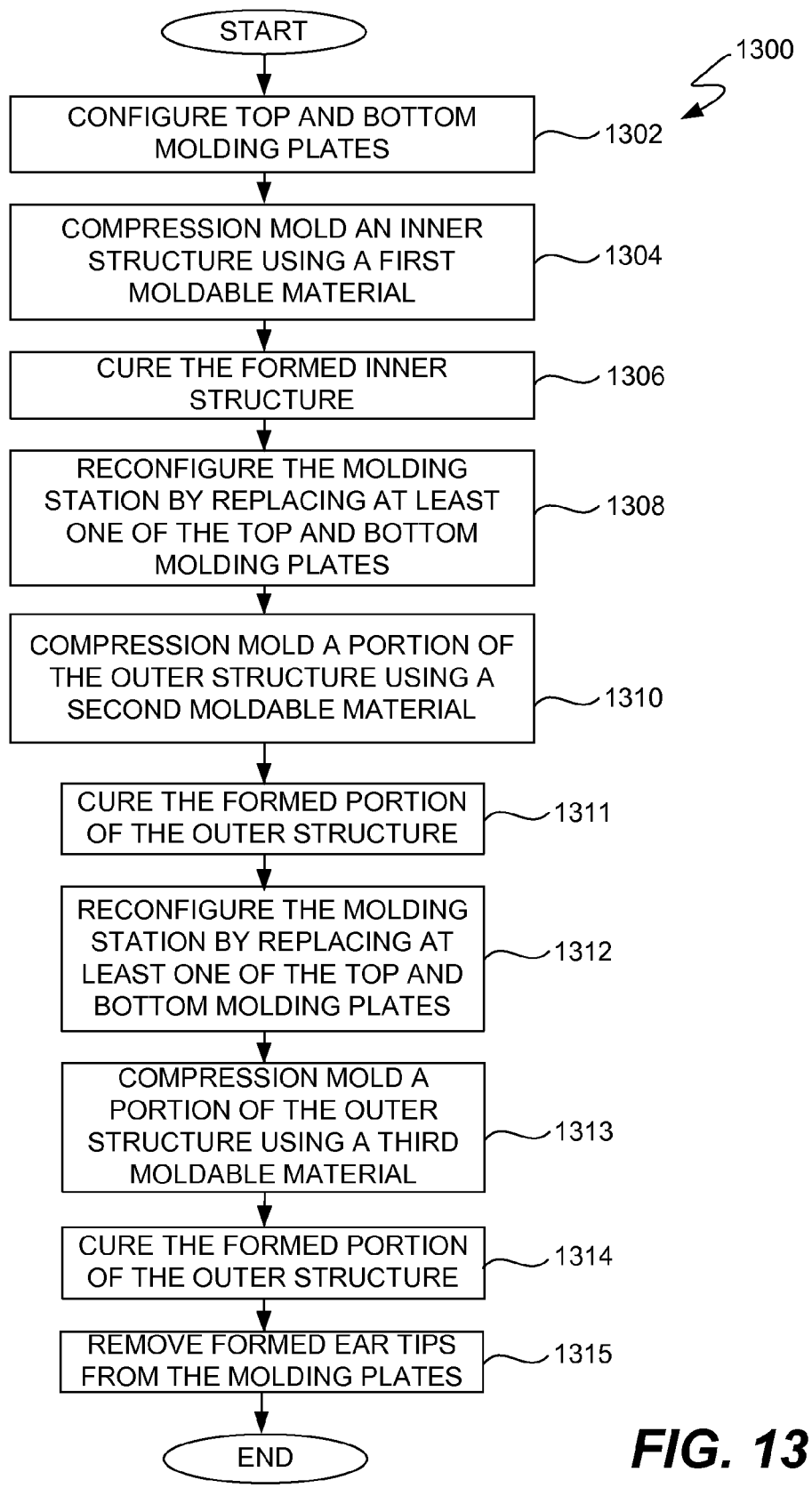
FIG. 13 is a flow diagram of an ear tip formation process according to another embodiment of the invention.

In some instances, separate molding processes may be used to form an outer structure, as for example when the outer structure is formed from a first material and a second material overmolded onto the first material. FIG. 13 is a flow diagram of an ear tip formation process 1300 which includes overmolding materials to form an outer structure of the ear tip according to another embodiment of the invention. The ear tip formation process 1300 can, for example, be used to form ear tips utilized by headphones. The ear tips being formed can, for example, be the ear tips 900, 1000, 1100 or 1500 illustrated in FIGS. 9A-11E and 15. However, the ear tips are not limited to being those illustrated in FIGS. 9A-11E and 15.

The ear tip formation process 1300 can initially configure 1302 top and bottom molding plates. The molding plates are associated with a molding station (e.g., an injection molding station) of an assembly area. The molding plates can be custom formed for molding ear tips in accordance with the invention. The top and bottom molding plates can form a first mold. Next, an inner structure can be compression molded 1304 using a first moldable material injected into the first mold. As an example, the first mobile material can be silicone. Once molded, the formed inner structure can be cured 1306. The inner structure can be cured 1306 using radiation, such as heat or UV light, and/or time.

Next, the molding station can be reconfigured 1308 by replacing one of the top and bottom molding plates. The new combination of molding plates can form a second mold. For example, the top molding plate utilized in the molding of the inner structure can be removed and replaced with a different top molding plate. In this case, the new top molding plate facilitates creation of an outer structure. After the molding station has been reconfigured 1308, a portion of an outer structure can be compression molded 1310 using a second moldable material injected into the second mold. As an example, the second moldable material can also be silicone such as a silicone foam, or the second moldable material can be a PU foam or a TPE foam. In one embodiment, the deformability of the second moldable material is significantly greater than that of the first moldable material. When the portion of the outer structure is compression molded 1310, it is integrally formed onto an upper portion of the inner structure. Once molded, the formed portion of the outer structure can be cured 1311.

The molding station can be reconfigured 1312 by replacing at least one of the top and bottom molding plates. The plate or plates may be reconfigured such that another portion of the outer structure may be compression molded. For example, a silicone skin may be formed over a silicone foam portion of the outer structure. Thus, a portion of the outer structure can be compression molded 1313, e.g., overmolded, using a third moldable material injected into a third mold. Once molded, the outer structure can be cured 1314.

The combination of the inner structure and the portions of the outer structure results in an ear tip. Since the molding plate typically forms a plurality of structures at one time, the ear tip formation process 1300 can concurrently produce a plurality of ear tips. After the formed outer structure has been cured 1314, the formed ear tip or tips can be removed 1315 from the molding plates. Following the block 1315, the ear tip formation process 1300 can end.

Figure 14:
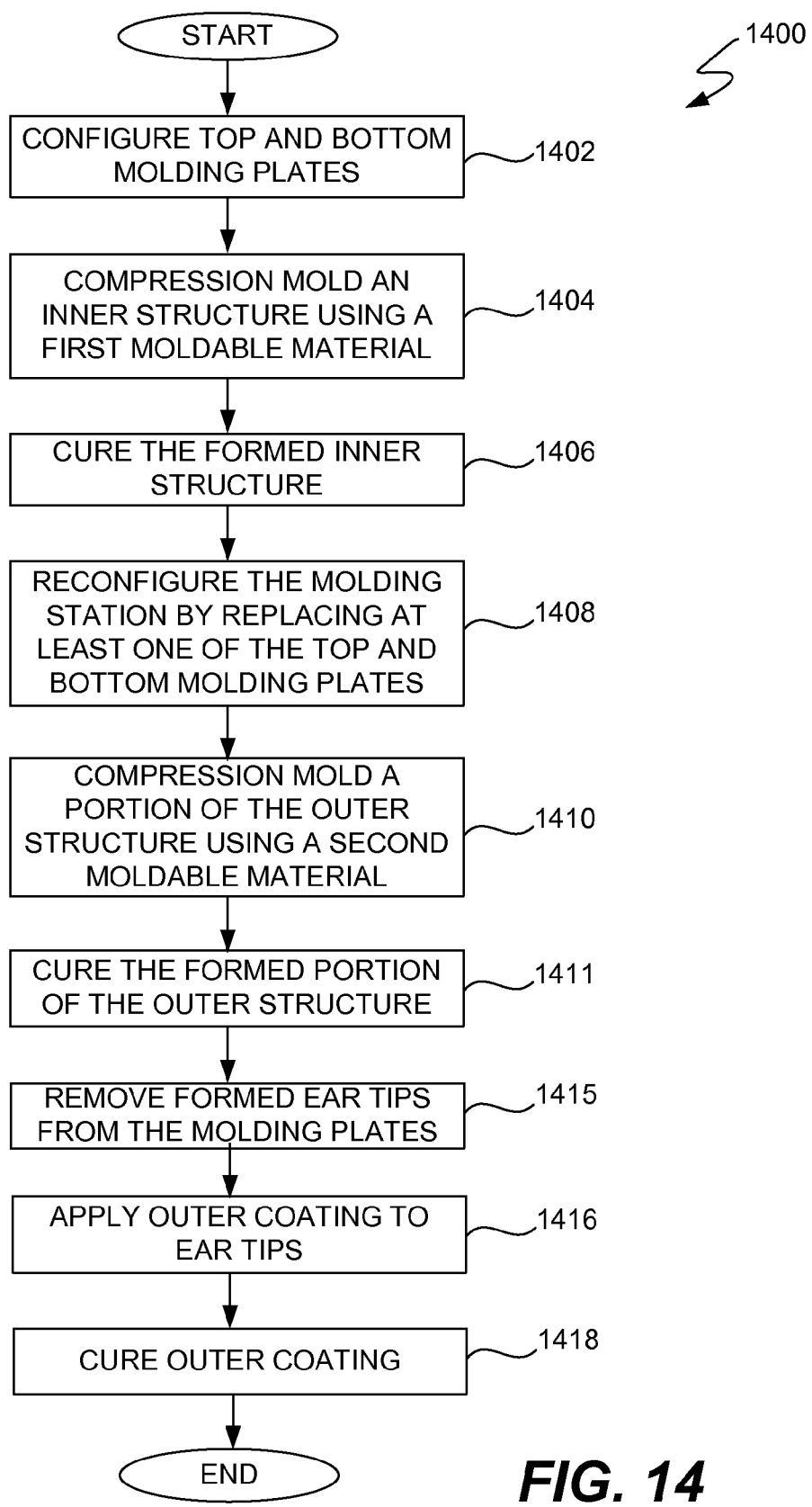
FIG. 14 is a flow diagram of an ear tip formation process according to still another embodiment of the invention.

As previously mentioned, a coating such as a silicone skin may be applied to an outer structure of an ear tip through a dipping or spraying process. FIG. 14 is a flow diagram of an ear tip formation process 1400 that includes applying a coating to an outer structure according to one embodiment of the invention. The ear tip formation process 1400 can, for example, be used to form ear tips utilized by headphones. The ear tips being formed can, for example, be the ear tips 900, 1000, 1100 or 1500 illustrated in FIGS. 9A-11E and 15.

The ear tip formation process 1400 can initially configure 1402 top and bottom molding plates. The molding plates are associated with a molding station (e.g., an injection molding station) of an assembly area. The molding plates can be custom formed for molding ear tips in accordance with the invention. The top and bottom molding plates can form a first mold. Next, an inner structure can be compression molded 1404 using a first moldable material injected into the first mold. As an example, the first mobile material can be silicone. Once molded, the formed inner structure can be cured 1406. The inner structure can be cured 1406 using radiation, such as heat or UV light, and/or time.

Next, the molding station can be reconfigured 1408 by replacing one or both of the top and bottom molding plates. The new combination of molding plates can form a second mold. For example, the top molding plate utilized in the molding of the inner structure can be removed and replaced with a different top molding plate. In this case, the new top molding plate facilitates creation of an outer structure. After the molding station has been reconfigured 1408, an outer structure can be compression molded 1410 using a second moldable material injected into the second mold. As an example, the second moldable material can also be silicone such as a silicone foam, or the second moldable material can be a PU foam or a TPE foam. In one embodiment, the deformability of the second moldable material is significantly greater than that of the first moldable material. When the outer structure is compression molded 1410 it is integrally formed onto an upper portion of the inner structure.

Once molded, the formed outer structure can be cured 1411. The combination of the inner structure and the outer structure results in an ear tip. Since the molding plate typically forms a plurality of structures at one time, the ear tip formation process 1400 can concurrently produce a plurality of ear tips. After the formed outer structure has been cured 1412, the formed ear tip or tips can be removed 1415 from the molding plates. An outer coating can be applied 1416 to ear tips. That is, a cosmetic surface can be applied to ear tips. Applying an outer coating may include, but is not limited to including, spraying an outer coating material onto the outer structure or dipping the outer structure into an outer coating material. By way of example, a silicone coating may be applied to a PU foam. Following the block 1416, the ear tip formation process 1400 can end.

Figure 15:
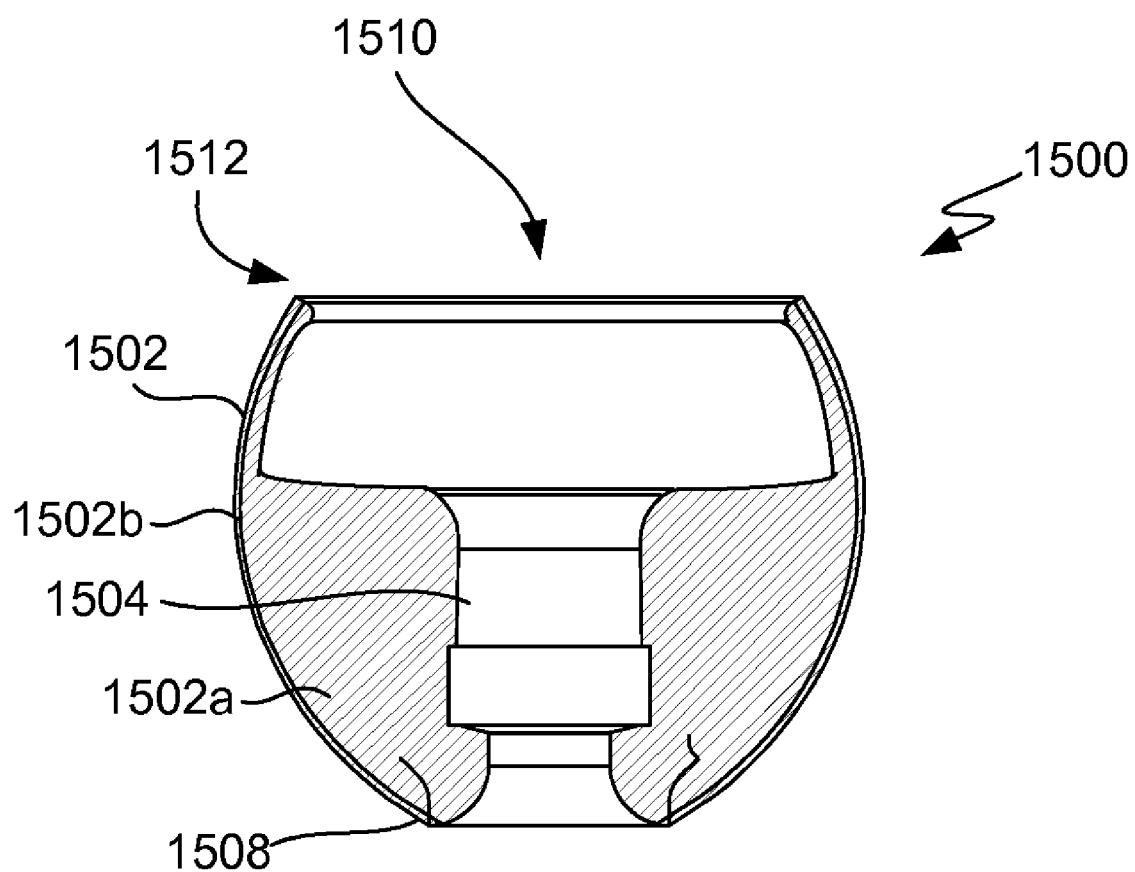
FIG. 15 is a cross-sectional representation of an ear tip which includes a plurality of layers according to an embodiment of the invention.

As previously mentioned, an outer structure of an ear tip may be formed from a material that is at least partially covered (e.g., coated) with another material. With reference to FIG. 15, an ear tip with an outer structure that is formed from a material, e.g., PU foam, that is covered (e.g., coated) by another material, e.g., a silicone film, is shown in accordance with an embodiment of the invention. An ear tip 1500 includes an inner structure 1504 that is covered by an outer structure 1502. The outer structure 1502 is adhered to or integral with the inner structure 1504 at a front surface 1508, as well as along sides of inner structure 1504. The outer structure 1502 extends over and around the inner structure 1504 but remains open at a bottom opening 1510 at a rear surface 1512.

The outer structure 1502 includes a first material 1502*a* and a second material 1502*b*. The first material 1502*a* may be, in one embodiment, a PU foam while the second material 1502*b* may be silicone. The second material 1502*b* may form a cosmetic surface of outer structure 1502. In general, the second material 1502*b* may form at least an exterior surface of the outer structure 1502.

In the ear tip formation processing 1200 the inner structure can be formed before the outer structure. However, in alternative embodiment, the outer structure can be formed before the inner structure. This alternative approach can yield improved durability and/or cosmetic appearance.

Figure 16:
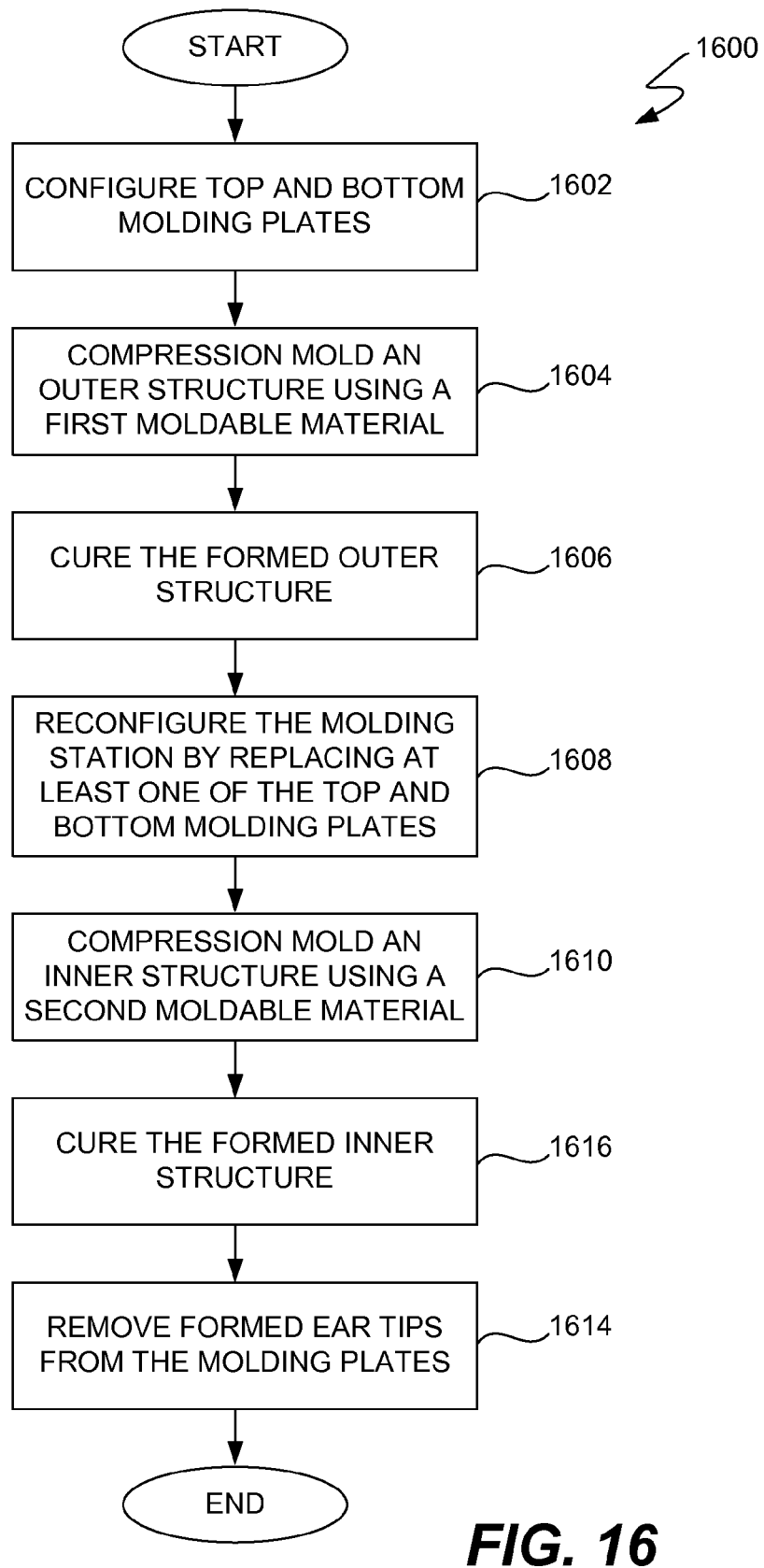
FIG. 16 is a flow diagram of an ear tip formation process according to yet another embodiment of the invention.

FIG. 16 is a flow diagram of an ear tip formation process 1600 according to one embodiment of the invention. The ear tip formation process 1600 can, for example, be used to form ear tips utilized by headphones. The ear tips being formed can, for example, be the ear tips 900, 1000, 1100 or 1500 illustrated in FIGS. 9A-11E and 15.

The ear tip formation process 1600 can initially configure 1602 top and bottom molding plates. The molding plates are associated with a molding station (e.g., an injection molding station) of an assembly area. The molding plates can be custom formed for molding ear tips in accordance with the invention. The top and bottom molding plates can form a first mold. Next, an outer structure can be compression molded 1604 using a first moldable material injected into the first mold. As an example, the first mobile material can be silicone. Once molded, the formed outer structure can be cured 1606. The outer structure can be cured 1606 using radiation, such as heat or UV light, and/or time.

Next, the molding station can be reconfigured 1608 by replacing one of the top and bottom molding plates. The new combination of molding plates can form a second mold. For example, the top molding plate utilized in the molding of the outer structure can be removed and replaced with a different top molding plate. In this case, the new top molding plate facilitates creation of an inner structure. The formed outer structure forms an inner cavity into which the inner structure is to be formed. The exposed inner surface of the formed outer structure may be sprayed or otherwise coated, in one embodiment, with a primer to assist with adhesion to the inner surface of the inner cavity of the outer structure. For example, if the first moldable material is silicone, which has low surface energy, a primer coating can assist with adhesion to other materials. On example of a suitable primer may be Silane. Silane is a chemical compound with chemical formula $SiH_4$.

After the molding station has been reconfigured 1608 and any primer applied, an inner structure can be compression molded 1610 using a second moldable material injected into the second mold. As an example, the second moldable material can also be silicone such as silicone foam, or the second moldable material can be a PU foam or a TPE foam. In one embodiment, the deformability of the first moldable material is significantly greater than that of the second moldable material. When the inner structure is compression molded 1610 it is integrally formed within the inner cavity of the outer surface. Once molded, the formed outer structure can be cured 1612. The combination of the inner structure and the outer structure results in an ear tip. Since the molding plate typically forms a plurality of structures at one time, the ear tip formation process 1600 can concurrently produce a plurality of ear tips. After the formed inner structure has been cured 1612, the formed ear tip or tips can be removed 1614 from the molding plates. Following the block 1614, the ear tip formation process 1600 can end.

In another embodiment, instead of applying a primer to the inner surface of the outer structure, corona processing can by induced on the inner surface of the outer structure so that adhesion characteristics can be improved. The corona processing acts as an electrically induced surface treatment. In generally, a corona discharge is an electrical discharge brought on by the ionization of a fluid surrounding a conductor, which occurs when the potential gradient (the strength of the electric field) exceeds a certain value, but conditions are insufficient to cause complete electrical breakdown or arcing.

In one embodiment of the ear tip formation process 1600, the formed outer structure can be highly durable and elastic such that it can be inverted. The application of the primer can be performed in mold or out of mold. In one embodiment, if may be advantageous to invert the inner surface of the formed outer structure so that it can be coated or sprayed with the primer or altered by corona processing. Thereafter, the outer structure can be uninverted.

In another embodiment, an inner structure for an ear tip can substantially extend through the height of the ear tip. The extended inner structure can improve tear strength for an open end of the ear tip. The extended inner structure can also reduce likelihood of delamination between the material of the inner structure and the material for the outer structure. As noted above, the material used for the inner structure and the outer structure can vary depending on implementation. In one example, the material for the inner structure is a solid PU, and the material for the outer material is PU foam. In another example, the material for the inner structure is silicone, and the material for the outer structure is PU foam. The material for the outer structure can be over-molded onto the material for the inner structure, or the material for the inner material can be over-molded onto the material for the outer material.

Figure 17:
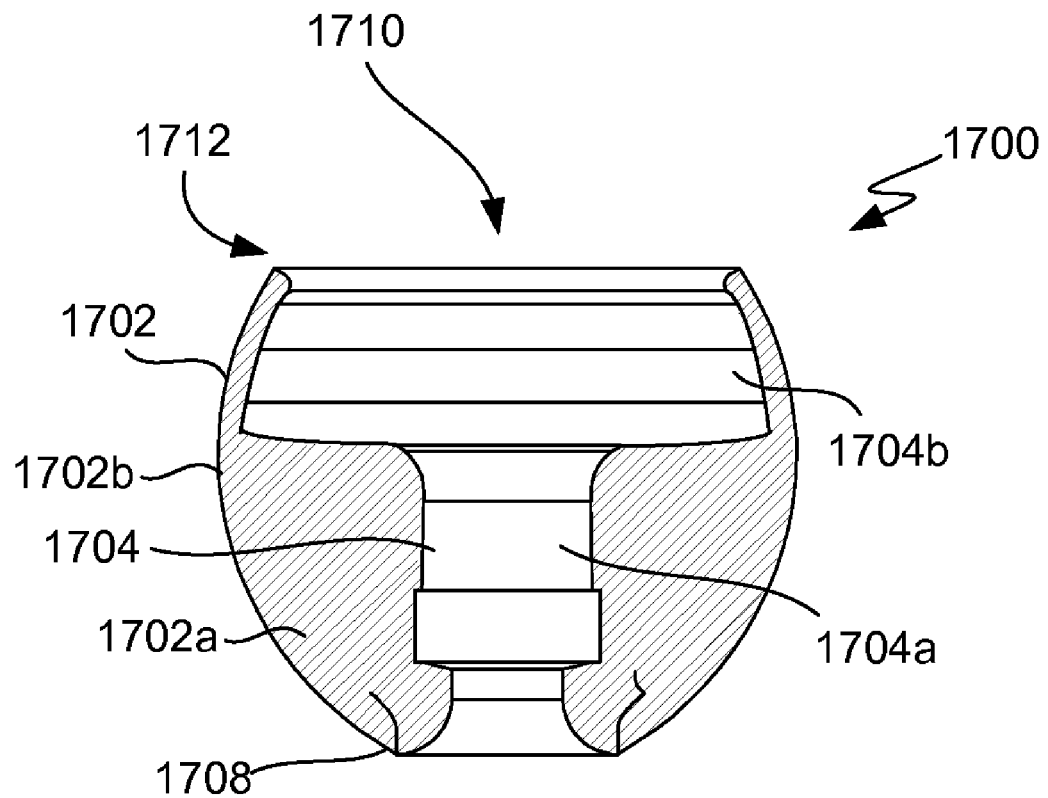
FIG. 17 illustrates an ear tip 1700 with an extended inner structure according to one embodiment of the invention.

FIG. 17 illustrates an ear tip 1700 with an extended inner structure according to one embodiment of the invention. The ear tip 1700 has an outer structure 1702. The outer structure 1702 is adhered to or integral with the inner structure 1704 at a front surface 1708, as well as along sides of inner structure 1704. The outer structure 1702 extends over and around the inner structure 1704 but remains open at a bottom opening 1710 at a rear surface 1712.

The inner structure 1704 has a lower portion 1704*a* and an upper portion 1704*b*. The lower portion 1704*a* of the inner structure 1704 is provided at a lower portion of the ear tip 1700, while the upper portion 1704*b* of the inner structure 1704 is provided at an upper portion of the ear tip 1700. As compared to other embodiments where the inner structure includes only the lower portion 1704*a* adjacent the lower portion of the ear tip 1700, in this embodiment the inner structure 1704 extends through the ear tip 1700. The addition of the upper portion 1704*b* can provide the ear tip 1700 with greater durability (e.g., increased tear strength).

The outer structure 1702 includes a first material 1702*a*. The first material 702*a* may be, in one embodiment, a PU foam. Optionally, such as illustrated in FIG. 15, the outer structure 1702 can also include a second material (e.g., second material 1502*b*). The second material for the outer structure 1702 may, for example, be silicone. The second material for the outer structure 1702, if provided, may form a cosmetic surface of outer structure 1702. In general, although not illustrated in FIG. 17, the second material for the outer structure 1702 may form at least an exterior surface of the outer structure 1702. The ear tip 1700 can be formed with a molding process that forms the inner structure 1704 before the outer structure 1702, or the ear tip 1700 can be formed with a molding process that forms the inner structure 1704 after the outer structure 1702.

Figure 18:
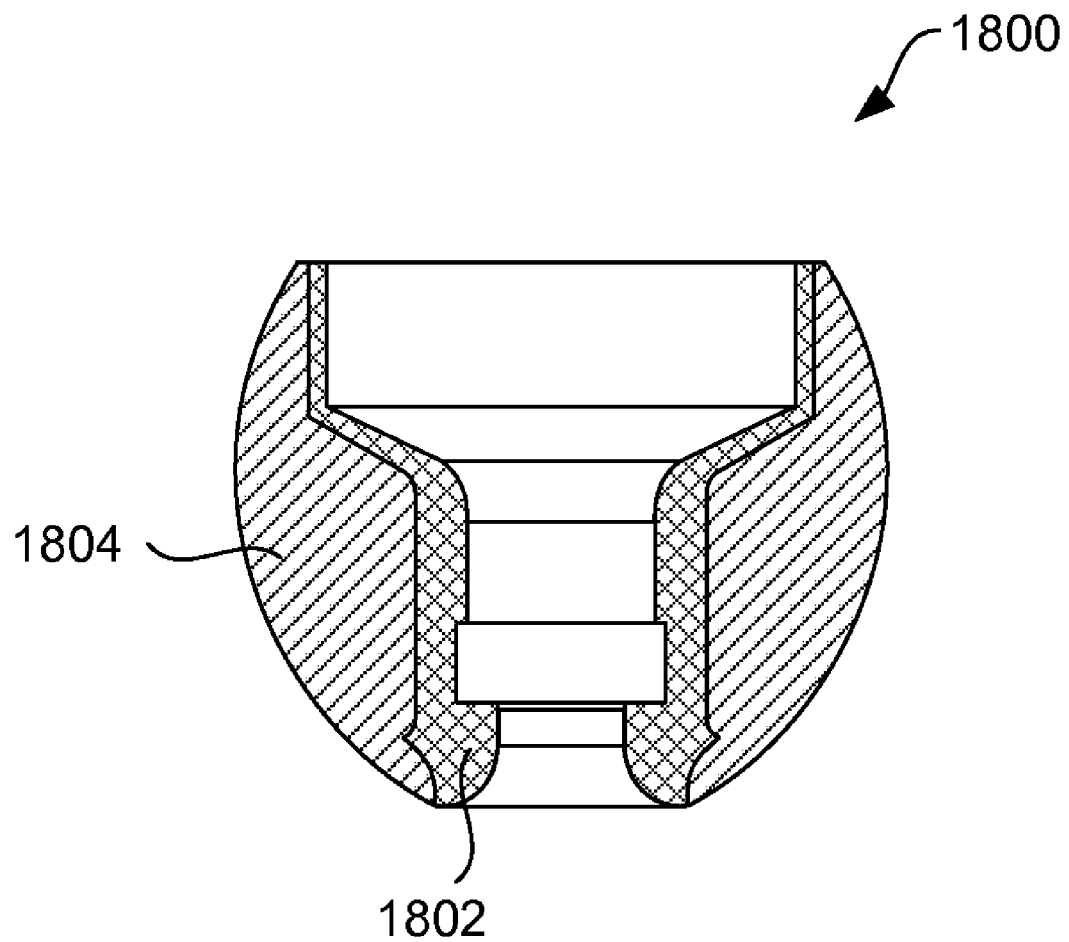
FIG. 18 is a perspective view of an ear tip with an extended inner structure according to one embodiment of the invention.

FIG. 18 is a cross-sectional view of an ear tip 1800 with an extended inner structure 1802 according to one embodiment of the invention. The ear tip 1800 can be formed from an inner member 1802 and an outer member 1804. In this exemplary embodiment, the inner member 1802 can be a solid urethane elastomer (e.g. solid PU) that extends substantially entirely through the ear tip 1800, which can serve to improve tear strength. The outer member 1804 can be an urethane foam (e.g., PU foam).

Figure 19A:
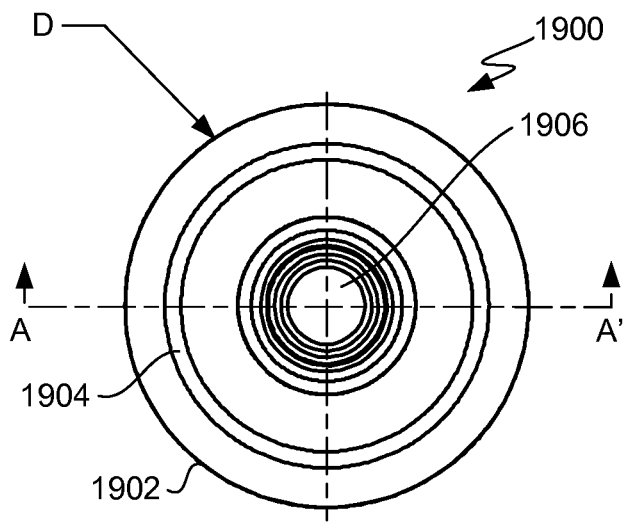
FIG. 19A is a rear view.
Figure 19B:
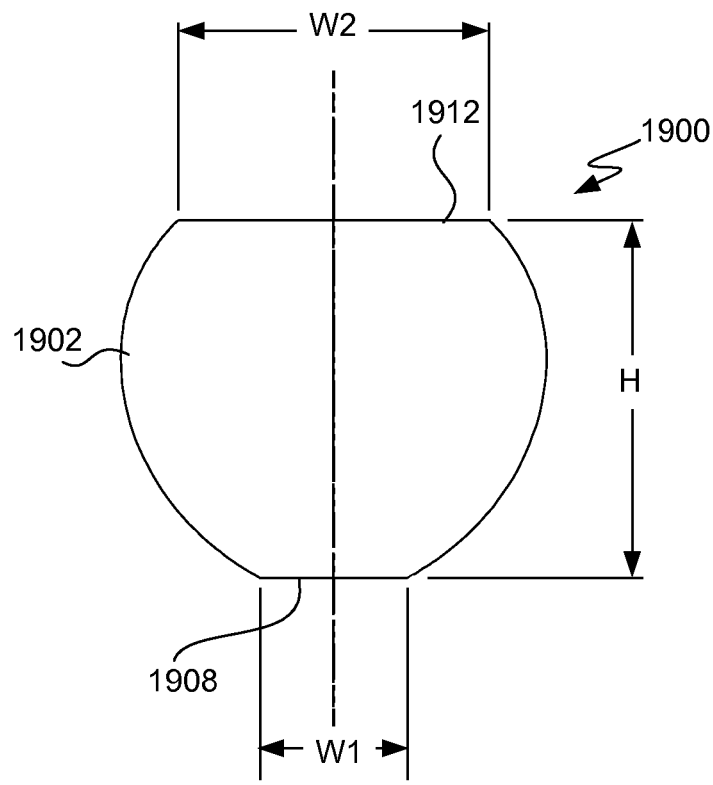
FIG. 19B is a side view.
Figure 19C:
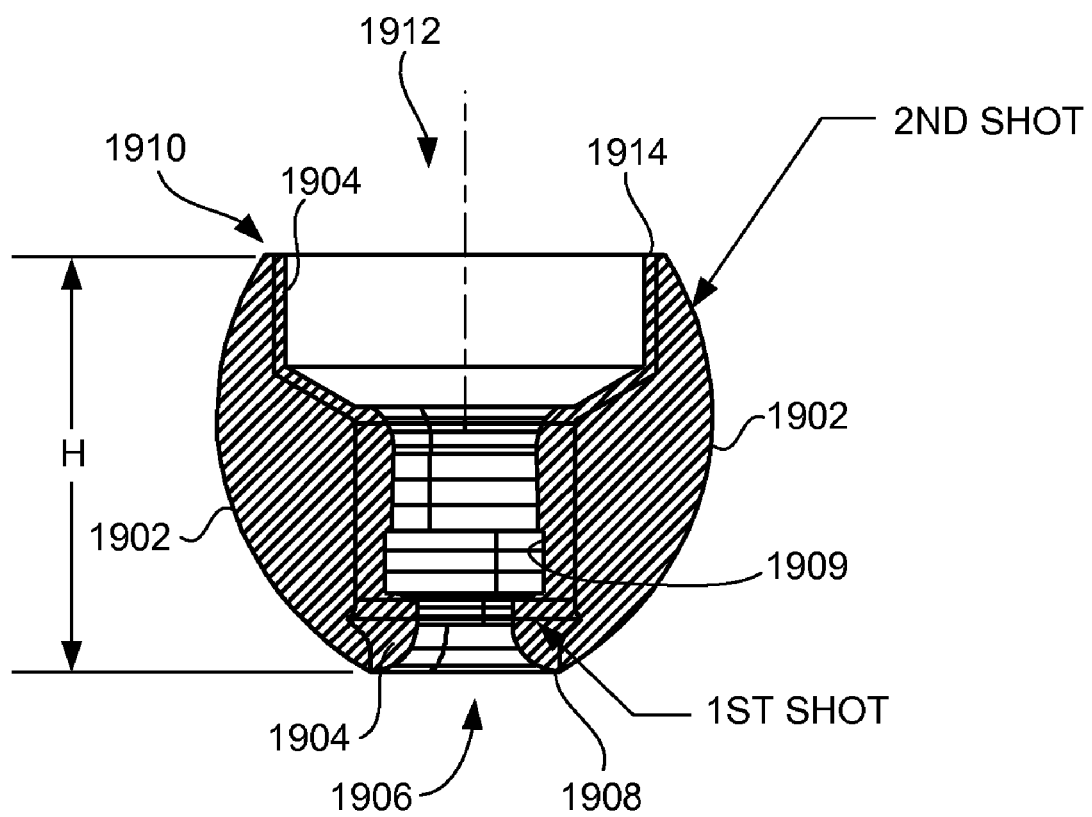
FIG. 19C is a cross-sectional view for an ear tip with an extended inner structure.

FIG. 19A is a rear view, FIG. 19B is a side view, and FIG. 19C is a cross-sectional view of an ear tip 1900 according to one embodiment. The ear tip 1900, like the ear tip 1700 illustrated in FIG. 17, has an extended inner structure.

The ear tip 1900 has an outer structure 1902 and an inner structure 1904. The configuration (e.g., shape) of the outer structure 1902 according to one embodiment is illustrated in FIG. 19B, which can be referred as a spherical. Here, the sides of the outer structure 1902 are rounded or curved. According to the embodiment illustrated in FIG. 19B, the ear tip 1900 can have a height (H) of 11.53 mm, the width (W1) (diameter) of the front surface 1108 can be 4.76 mm, the width (W2) (diameter) of the rear surface 1914 can be 10.01 mm. However, it should be understood that these sizes are exemplary and that the sizes vary with implementation. Often, the ear tips 1900 are formed in various sizes (e.g., small, medium and large) to accommodate user's with different size ears.

In FIG. 19C, the configuration of the inner structure 1904 according to one embodiment is illustrated. The inner structure 1904 can be formed with a first compression molding process, and the outer structure 1902 can be formed with a second compression molding process. The inner structure 1904 can be cylindrical, so as to have a tubular configuration. The front region of the inner structure 1904 provides an opening 1906 through which audio sound can be provided to a user's ear. The front region of the inner structure 1904 may adhere to or may be integral with the front region of the outer structure 1902 at a front surface 1908. Additionally, the internal configuration of the inner structure 1904 can include one or more attachment features that facilitate attachment of the inner structure 1904 of the ear tip 1900 to a headphone. For example, the internal configuration of the inner structure 1904 can include at least one recess 1909 that can serve as an attachment feature. Outer sides of the inner structure 1904 may also be adhered to outer structure 1902. In one embodiment, the hardness of the inner structure 1904 and the outer structure 1902 are configured differently. For example, the inner structure 1904 can have a greater hardness that the outer structure 1902. In other words, in such an example, the outer structure 1902 can be softer than the inner structure 1904. In one implementation, according to a durometer measurement, the durometer of the inner structure 1904 can be about sixty (60), and the durometer of the outer structure 1902 can be about forty (40). The ear tip 1900 also has a rear region 1910. The rear region 1910 can provide an opening 1912 for receiving an ear tip. The rear portion of the inner structure 1904 may adhere to or may be integral with the rear region of the outer structure 1902 at the rear region 1910 of the ear tip 1900. More generally, in one embodiment, some or all of the outer sides of the inner structure 1904 can adhere to or be integral with some or all of the inner sides of the outer structure 1902.

Figure 20A:
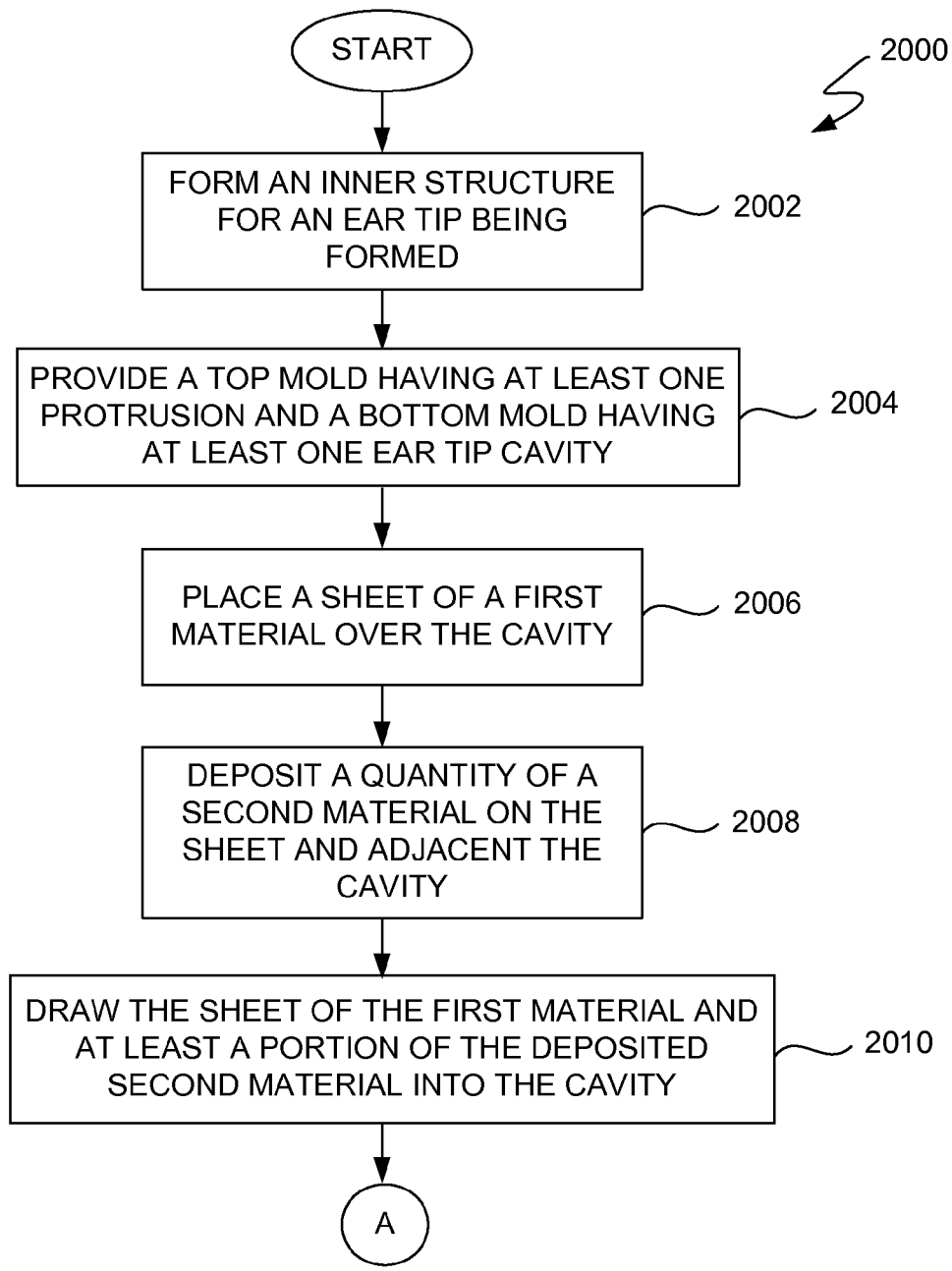
FIGS. 20A and 20B illustrates a flow diagram of an ear tip formation process according to one embodiment.
Figure 20B:
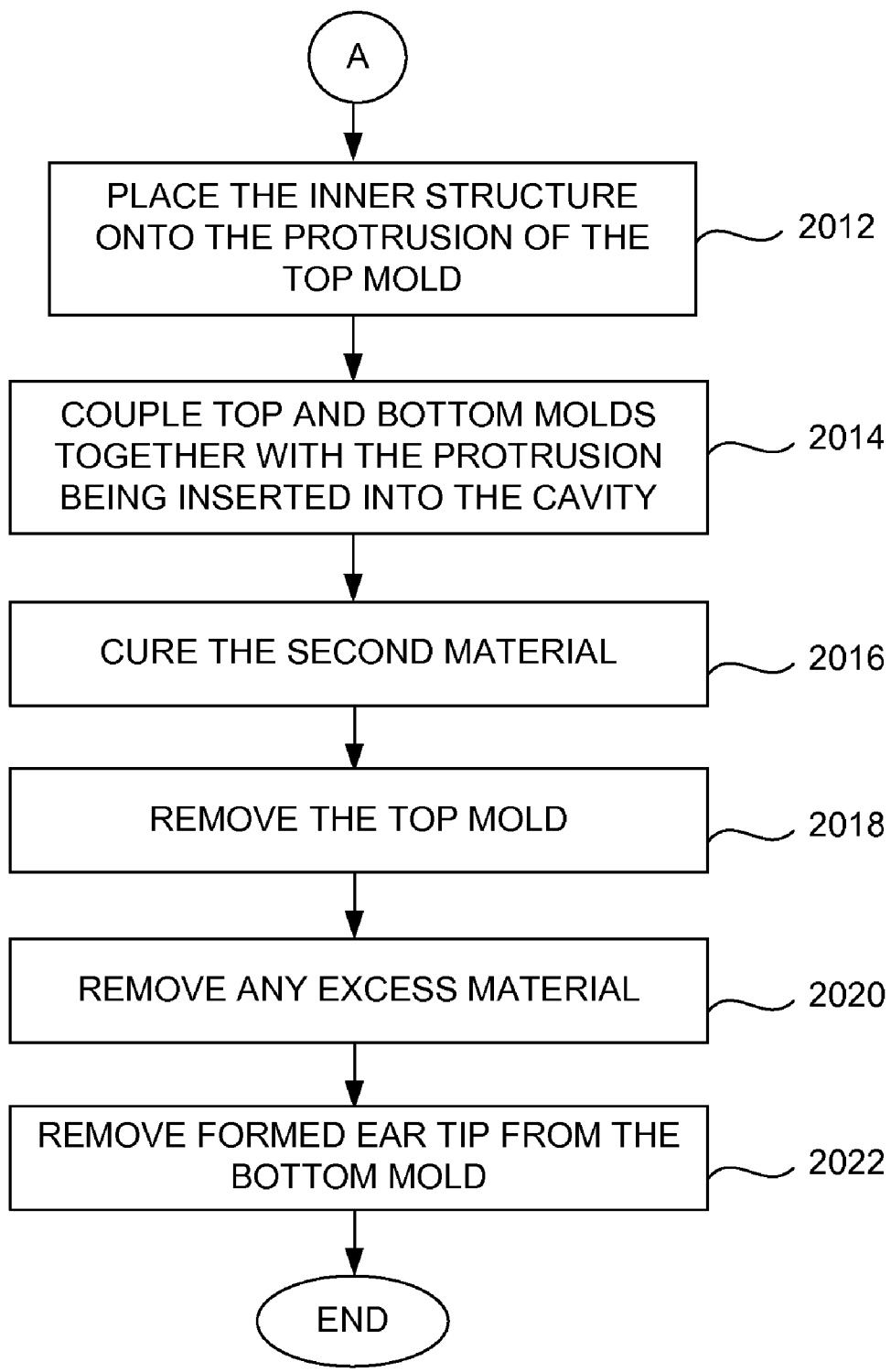

FIGS. 20A and 20B illustrated a flow diagram of an ear tip formation process 2000 according to one embodiment. The ear tip formation process 2000 can, for example, be used to form ear tips utilized by headphones. The ear tips being formed can, for example, be the ear tips 1800 or 1900 illustrated in FIGS. 18-19C.

The ear tip formation process 2000 can initially form 2002 an inner structure for an ear tip being formed. The inner ear structure for the ear tip can be formed in a variety of different ways, including by a molding process.

After obtaining the inner structure, the ear tip formation process 2000 can form an outer structure for the ear tip. The outer structure can be formed using molding plates associated with a molding station (e.g., an injection molding station) at an assembly area. The molding plates can be custom formed for molding ear tips in accordance with the invention. To form the outer structure for the ear tip, a top mold having at least one protrusion and a bottom mold having at least one ear tip cavity can be provided 2004. A sheet of a first material can be placed 2006 over the ear tip cavity in the bottom mold. The sheet can be a thin sheet of polyurethane (e.g., thermoset polyurethane (TPU). For example, the sheet can be a polyurethane sheet (or film) with a thickness of 0.1 mm. More generally, the sheet has a thickness of 0.5-5 mm and can be formed of an elastomer.

Next, a quantity of a second material can be deposited 2008 on the sheet and adjacent the ear tip cavity in the bottom mold. The second material is used in forming the outer structure for the ear tip. For example, the second material can be a polyurethane form. Next, the sheet and the second material deposited there on can be drawn 2010 into the cavity. For example, in one implementation, a vacuum can be induced to draw 2010 the sheet as well as at least a portion of the deposited second material into the cavity. In one implementation, the bottom mold it is a porous metal mold (e.g., porous aluminum or steel), such that when a vacuum is imposed, a pressure difference can be formed to draw the sheet and the at least a portion of the deposited second material into the cavity.

Thereafter, the inner structure that was previously formed 2002 can be placed 2012 onto the protrusion of the top mold. The protrusion of the top mold can be designed to receive the inner structure for the ear tip being formed. The top mold and the bottom mold can then be coupled 2014 together with the protrusion being inserted into the cavity. At this point, the second material can be cured 2016. The curing can be facilitated through heat, such as through heating of one or more of the molds.

After the second material has been cured 2016, the top mold can be removed 2018. Any excess material, namely, the second material, can also be removed 2020. At this point, the ear tip has been formed and can then be removed 2022 from the bottom mold. In one implementation, air pressure can be applied to the porous bottom mold to cause the formed ear tip to dislodge from the bottom mold. Following the block 2022, the ear tip formation process 2000 can end.

FIGS. 21A-21G are cross-sectional diagrams illustrating ear tip formation according to one embodiment of the invention.

Figure 21A:
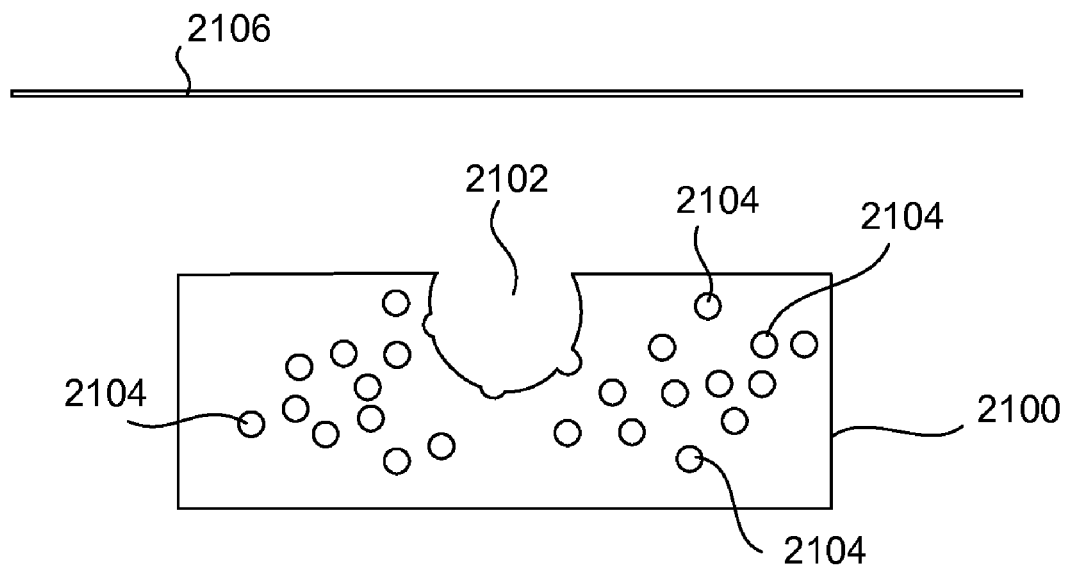
FIGS. 21A-21G are cross-sectional diagrams illustrating ear tip formation according to one embodiment of the invention.

FIG. 21A illustrates a bottom mold 2100 according to a first stage of the ear tip formation. The bottom mold 2100 includes a cavity 2102. The cavity 2102 is configured to have a shape suitable for formation of an outer member of the ear tip. In one embodiment, the bottom mold 2100 can also include a plurality of holes 2104. In other words, the bottom mold can be referred to as a porous mold, and/or the cavity 2102 can be referred to as a porous cavity. In addition, an elastomer film 2106 (e.g., polyurethane) is provided for formation of the ear tip. The elastomer film 2106 can provide an outer surface for the ear tip being formed.

Figure 21B:
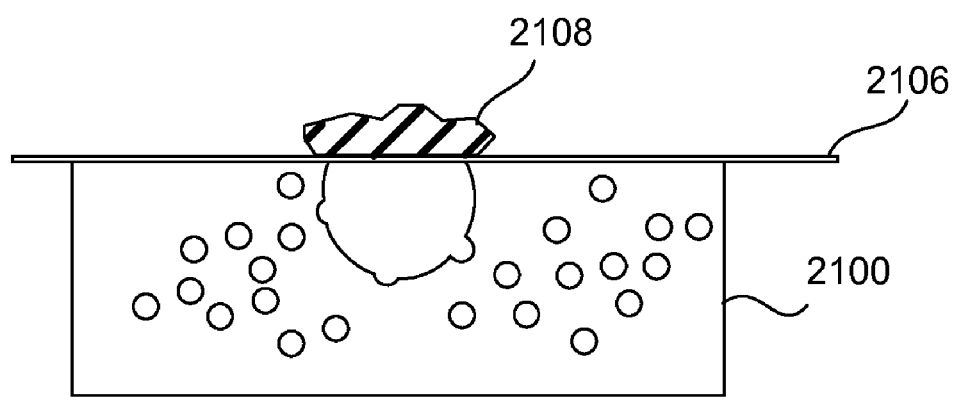

FIG. 21B illustrates the bottom mold 2100 according to a second stage of the ear tip formation. In the second stage, the elastomer film 2106 is placed over the cavity 2102. In doing so, the elastomer film 2106 extends beyond simply covering the cavity 2102. Additionally, a quantity of viscous outer material 2108 (e.g., polyurethane foam) can be deposited on the elastomer film 2106 over the cavity 2102.

Then, a vacuum pressure can be applied to the bottom mold 2100 (or at least the cavity 2102 portion thereof). The vacuum pressure can be applied to the cavity 2102 since the bottom mold 2100 (or the cavity 2102) is porous. As a result, the viscous outer material 2108 is drawn into the cavity 2102.

Figure 21C:
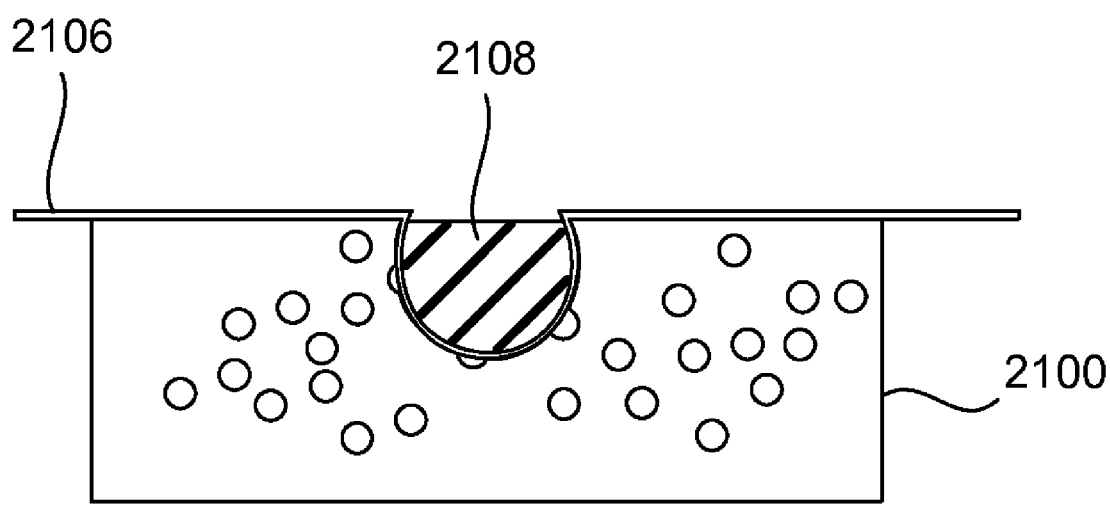

FIG. 21C illustrates the bottom mold 2100 according to a third stage of the ear tip formation. Here, the elastomer film 2106 and the viscous outer material 2108 previously over the cavity 2102 are now within the cavity 2102. Through application of heat, the viscous outer material 2108 can expand to fill the cavity 2102.

Figure 21D:
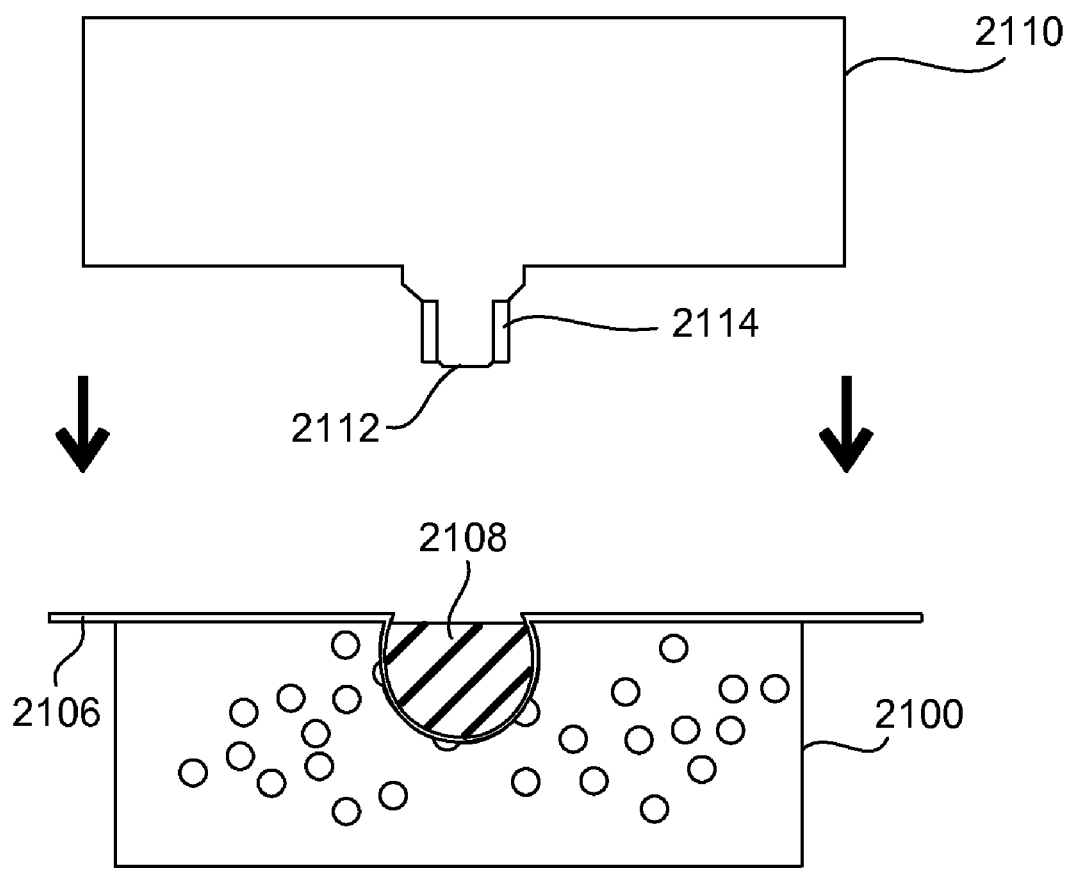
Figure 21E:
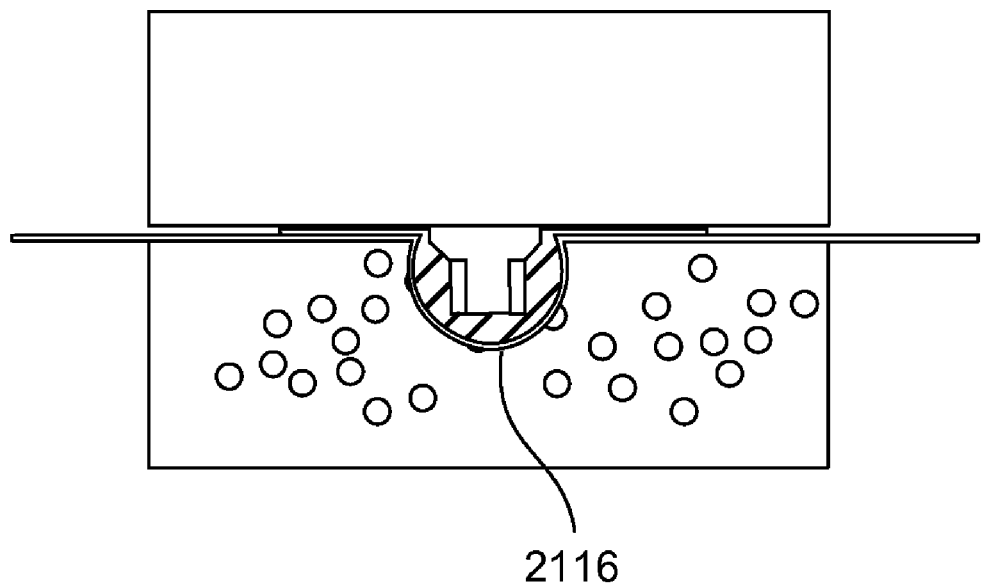

FIG. 21D illustrates a top mold 2110 and the bottom mold 2100 according to a fourth stage of the ear tip formation. The top mold 2110 can include a protrusion 2112 configured to receive an inner member 2114 (e.g., inner core element for the ear tip). Typically, the inner member 2114 is separately molded and thus available to be provided on the protrusion 2112. In one implementation, the top mold 2110 can be formed of steel.

FIG. 2E illustrates formation of the ear tip according to a fifth stage of the ear tip formation. To form the ear tip, the inner member 2114 is then shaped and connected to the inner member 2114 by bring the top mold 2110 and the bottom mold 2100 together. As shown in FIG. 2E, when the top mold 2110 and the bottom mold 2100 are brought together, the protrusion 2112 of the top mold 2110, having the inner member 2114 provided thereon, is inserted within the cavity 2102. Consequently, an outer member 2116 for the ear tip is formed. The outer surface of the outer member 2116 is provided by the viscous outer material 2108 conformed against the inner surface of the cavity 2102 via the elastomer film 2106. In doing so, the outer member 2116 is attached to the inner member 2114. For example, the outer member 2116 can be molded onto a portion of the inner member 2114. The viscous outer material 2108 can be then cure or solidify. The top mold 2110 can be separated from the bottom mold 2100.

When the top mold 2110 and the bottom mold 2100 are brought together, some of the viscous outer material 2108 that was drawn into the cavity 2102 can be displaced from the cavity 2102. In other words, a portion of the viscous outer material 2108 can overflow outward from the cavity 2102. The overflowed outer material 2108' can reside on the top of the bottom mold 2100.

Figure 21F:
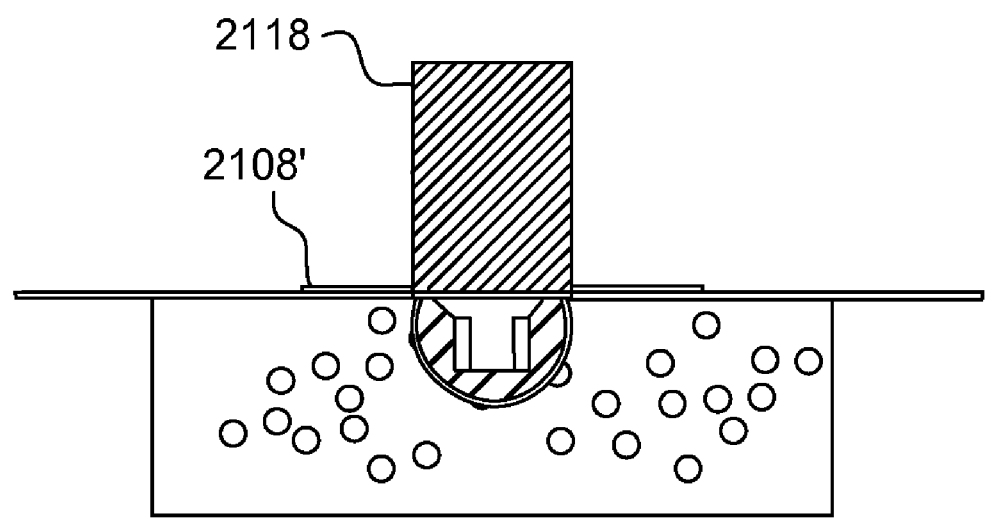

FIG. 21F illustrates formation of the ear tip according to a sixth stage of the ear tip formation. The sixth stage provides for removal of undesired materials from the ear tip after removing the top mold 2110. A heated die 2118 can be used to separate the residual or undesired materials from the ear tip that has been formed. For example, the residual or undesired materials can include any excess portion of the elastomer film 2106 as well as any of the viscous outer material 2108' that displaces from the cavity 2102 to the surface of the bottom mold 2000. The heated die 2118 can be brought against the top surface of the bottom mold 2100 adjacent the cavity 2102. The heated die 2118 serves to separate the formed ear tip from any residual or undesired portions of (i) that portion of the viscous outer material 2108' that has overflowed onto the top of the bottom surface 2100, and/or (ii) that excess portion of the elastomer film 2106 that remains on the top of the bottom surface 2100.

Figure 21G:
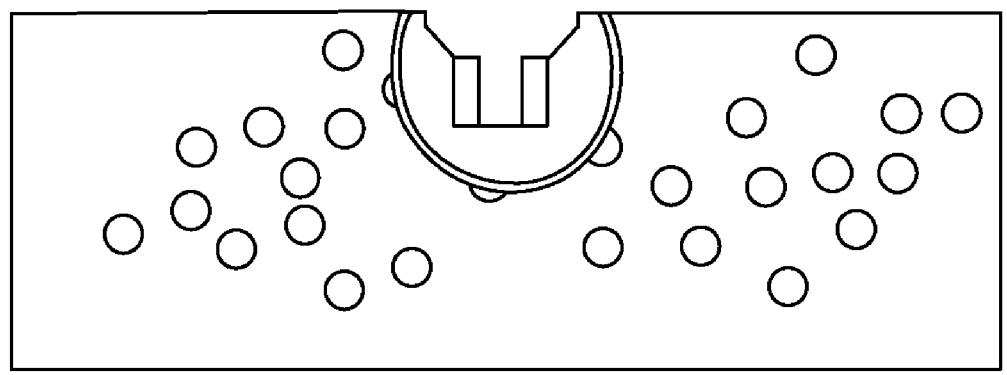

FIG. 21G illustrates formation of the ear tip according to a seventh stage of the ear tip formation in which the ear tip is fully formed. Thereafter, the formed ear tip can be removed from the bottom mold 2100. In one embodiment, to easily remove the formed ear tip from the bottom mold 2106, air pressure can be used to push the formed ear tip out of the cavity 2102. Since the bottom portion 2100 or at least its cavity 2102 has holes, an applied air pressure can be supplied to the cavity 2102 to withdraw of the formed ear tip from the cavity 2102, and usually without any damage thereto.

Although the ear tip formation illustrated in FIGS. 21A-21G depict formation of a single ear tip, it should be understood that a plurality of ear tips can be concurrently formed, such as in a batch. In such case the elastomer film 2106 can be provide as a sheet of elastomer material that extends over the cavities used to form the plurality of ear tips concurrently.

The ear tips being formed can, for example, be formed from one or more elastomers. An ear tip may be formed from materials including, but not limited to including, polyurethane (PU) foam, PU foam with a silicone skin, silicone gel with a silicone rubber skin, PU foam with a PU skin, silicone foam, or a thermoplastic (TPE) foam. In the case of embodiments with an inner structure and an outer structure, the inner structure can be less compliant, so as to provide more structural support, while the outer structure can be more compliant, so as to adapt to a user's ear and provide a comfortable fit. Although the inner structure and the outer structure can be formed of the same material or materials of a like composition, which can facilitate bonding between the inner structure and the outer structure, it is not necessary that the materials used for the inner structure and the outer structure be the same.

In one embodiment, the outer structure can be formed with a gel or foam, such as silicone gel, silicone foam or polyurethane foam. For durability and/or cosmetics reasons, exposed portions of the outer structure can be covered. For example, the formed gel or foam of the outer structure that is exposed can be covered (e.g., by a film or by spray) with silicone, polyurethane or some other material. As another example, a layer of silicon can be molded onto the exposed portion of the formed gel or foam of the outer structure.

In another embodiment an ear tip can include a filter for substantially blocking foreign matter. An inner structure of an ear tip may include a filter such as a mesh. The filter can, for example, be formed of metal, such as stainless steel, or a polymer, such as nylon.

The various aspects, features, embodiments or implementations of the invention described above can be used alone or in various combinations.

This application references: (i) U.S. patent application Ser. No. 12/124,471, filed May 21, 2008, entitled "INVERTIBLE EAR TIPS FOR AN EAR PIECE", which is hereby incorporated herein by reference; (ii) U.S. patent application Ser. No. 12/205,749, filed Sep. 5, 2008, entitled "EARPHONE WITH REMOVABLE COMPONENT", which is hereby incorporated herein by reference; and (iii) U.S. patent application Ser. No. 12/205,748, filed Sep. 5, 2008, entitled "REMOVABLE EAR TIP FOR EARPHONE", which is hereby incorporated herein by reference.

The many features and advantages of the present invention are apparent from the written description. Further, since numerous modifications and changes will readily occur to those skilled in the art, the invention should not be limited to the exact construction and operation as illustrated and described. Hence, all suitable modifications and equivalents may be resorted to as falling within the scope of the invention.

What is claimed is:

1. An ear tip for a headphone, comprising:
   an inner cylindrical structure configured to removably attach to the headphone; and
   an outer spherical structure integral with or adhered to at least a top end and sides of said inner cylindrical structure, said outer spherical structure being formed at least partially from a deformable material, said outer spherical structure having a front surface and a rear surface, and said outer cylindrical structure being integrally formed with said inner spherical structure at the front surface,
   wherein the deformable material includes an outer cosmetic surface,
   wherein said inner cylindrical structure is an elastomer of a first hardness and said outer spherical structure is an elastomer of a second hardness, wherein the second hardness is less than the first hardness, and
   wherein said inner cylindrical structure includes at least one feature to mechanically secure said inner cylindrical structure to the headphone.

2. An ear tip as recited in claim 1, wherein the elastomer comprises one selected from the group including silicone, polyurethane, and thermoplastic.

3. An ear tip as recited in claim 1, wherein said inner cylindrical structure comprises silicone, and wherein said outer spherical structure comprises polyurethane.

4. An ear tip as recited in claim 1, wherein said outer spherical structure comprises a polyurethane foam and the cosmetic surface comprises at least a chemically treated polyurethane surface or a silicone skin.

5. An ear tip as recited in claim 1, wherein said outer spherical structure comprises silicone.

6. An as recited in claim 1, wherein the silicone comprises a silicone gel or a silicone foam.

7. An ear tip as recited in claim 1, wherein said outer spherical structure is molded onto said top end and said side surfaces of said inner cylindrical structure.

8. An ear tip as recited in claim 1, wherein said outer spherical structure is sealed against the top end of said inner cylindrical structure but is not sealed to the bottom end of said inner cylindrical structure.

9. An ear tip as recited in claim 8, wherein when said ear tip is attached to the headphone, said outer spherical structure is also not sealed against headphone.

10. An ear tip as recited in claim 8, wherein a protrusion of the headphone is received into said inner cylindrical structure via an opening of said outer spherical structure.

11. An ear tip as recited in claim 1, wherein said outer spherical structure is separate from said inner cylindrical structure at the rear surface and forms a opening.

12. A method for forming ear tips, the method comprising:
    configuring a molding station having top and bottom molding plates;
    first compression molding an inner structure using a first moldable material;
    curing the formed inner structure;
    reconfiguring the molding station by replacing one of the top and bottom molding plates;
    second compression molding at least a portion of an outer structure using a second moldable material;
    curing the at least a portion of the outer structure that has been formed by the second compression molding; and
    removing a resulting ear tip from the molding station; and
    applying an outer coating to the at least a portion of the outer structure,
    wherein the first moldable material comprises an elastomer of a first hardness and wherein the second moldable material comprises an elastomer of a second hardness, the second hardness being less than the first hardness.

13. A method as recited in claim 12, wherein following the curing the at least a portion of the outer structure that has been formed by the second compression molding and prior to the removing a resulting ear tip from the molding station, the method further comprising:
    reconfiguring the molding station by replacing one of the top and bottom molding plates;
    third compression molding at least another portion of an outer structure using a third moldable material; and
    curing the at least another portion of the outer structure that has been formed by the third compression molding.

14. A method for forming ear tips, the method comprising:
    configuring a molding station having top and bottom molding plates;
    first compression molding an outer structure using a first moldable material;
    curing the formed outer structure;
    reconfiguring the molding station by replacing at least one of the top and bottom molding plates;
    second compression molding at least a portion of an inner structure using a second moldable material;
    curing the at least a portion of the inner structure that has been formed by the second compression molding; and
    removing a resulting ear tip from the molding station,
    wherein the first moldable material comprises an elastomer of a first hardness and wherein the second moldable material comprises an elastomer of a second hardness, the second hardness being less than the first hardness, and
    wherein said inner structure includes at least one feature to mechanically secure said inner structure to the headphone.

15. An ear tip for a headphone, comprising:
    an inner cylindrical structure configured to removably attach to the headphone; and
    an outer spherical structure integral with or adhered to at least sides of said inner cylindrical structure, said outer spherical structure being formed at least partially from a deformable material,
    wherein said inner cylindrical structure extends substantially through the ear tip,
    wherein said outer spherical structure is sealed against the top end of said inner cylindrical structure,
    wherein said inner cylindrical structure comprises an elastomer of a first hardness and said outer spherical structure comprises an elastomer of a second hardness, wherein the second hardness is less than the first hardness, and
    wherein said inner cylindrical structure includes at least one feature to mechanically secure said inner cylindrical structure to the headphone.

16. An ear tip as recited in claim 15, wherein the elastomer comprises one or more of silicone, polyurethane, or thermoplastic.

17. An ear tip as recited in claim 16, wherein the deformable material comprises a polyurethane foam.

18. An ear tip as recited in claim 15, wherein said outer spherical structure is molded onto said top end and said side surfaces of said inner cylindrical structure.

19. An ear tip as recited in claim 15, wherein said outer spherical structure is sealed against the bottom end of said inner cylindrical structure.

20. An ear tip as recited in claim 19, wherein when said ear tip is attached to the headphone, said outer spherical structure is also not sealed against headphone.

21. An ear tip for a headphone, comprising:
    an inner cylindrical structure configured to removably attach to the headphone;
    an outer rounded structure integral with or adhered to said inner cylindrical structure, said outer rounded structure being formed at least partially from a deformable material; and
    an outer film provided around said outer rounded structure, thereby providing an outer surface for the ear tip,
    wherein said inner cylindrical structure comprises an elastomer of a first hardness and said outer rounded structure comprises an elastomer of a second hardness, wherein the second hardness is less than the first hardness, and
    wherein the outer film has a thickness of less than 2.0 mm.

22. An ear tip as recited in claim 21, wherein said inner cylindrical structure comprises a thermoplastic elastomer.

23. An ear tip as recited in claim 21,
    wherein said outer rounded structure comprises a polyurethane foam, and
    wherein said inner cylindrical structure comprises a solid polyurethane.

24. An ear tip as recited in claim 23,
    wherein said outer film comprises a solid polyurethane.

25. An ear tip as recited in claim 21, wherein said inner cylindrical structure extends substantially through the ear tip.

26. A method for forming an ear tip, the method comprising:
    providing an inner structure for an ear tip;
    providing a top mold having at least one protrusion;
    providing a bottom mold having an ear tip cavity;
    depositing a quantity of a second material into and/or adjacent the ear tip cavity so as to form an outer structure;
    coupling the top and bottom molds together with the protrusion being inserted into the ear tip cavity;
    curing the ear tip being formed within the ear tip cavity;
    after the curing, removing the to mold;
    removing excess portions of the first material and the second material from the formed ear tip; and
    removing the formed ear tip from the bottom mold,
    wherein the inner structure of the formed ear tip comprises an elastomer of a first hardness and wherein the outer structure of the formed ear tip comprises an elastomer of a second hardness, the second hardness being less than the first hardness.

27. A method as recited in claim 26, wherein the bottom mold is porous at least in the vicinity of the ear tip cavity.

28. A method as recited in claim 27, wherein the depositing of the second material comprises:
    depositing a quantity of the second material on a sheet and adjacent the ear tip cavity; and
    applying a vacuum to the porous bottom mold to draw the sheet of the first material and the at least a portion of the deposited second material into the ear tip cavity.

29. A method as recited in claim 26, wherein the method comprises:
    after the depositing of the quantity of the second material, heating the bottom mold or the ear tip cavity thereof.

30. A method as recited in claim 26, wherein the method comprises:
    prior to the coupling the top and bottom molds together, placing the molded inner structure onto the protrusion of the top mold.

31. A method for forming an ear tip, the method comprising:
    forming an inner structure for an ear tip;
    providing a top mold having at least one protrusion;
    providing a porous bottom mold having an ear tip cavity;
    placing a sheet of a first material over the cavity, the sheet being used to form an outer film for the ear tip;
    depositing a quantity of a second material on the sheet and adjacent the cavity so as to form an outer structure;
    applying a vacuum to the porous bottom mold to draw the sheet of the first material and the at least a portion of the deposited second material into the cavity;
    placing the molded inner structure onto the protrusion;
    heating the cavity;
    coupling the top and bottom molds together with the protrusion being inserted into the cavity;
    curing the ear tip being formed within the cavity;
    subsequently removing the top mold;
    removing excess portions of the first material and the second material; and
    removing the formed ear tip from the bottom mold,
    wherein the inner structure of the formed ear tip comprises an elastomer of a first hardness and wherein the outer structure of the formed ear tip comprises an elastomer of a second hardness, the second hardness being less than the first hardness.

32. A method as recited in claim 31, wherein the forming of the inner structure comprises compression molding the inner structure.

* * * * *

UNITED STATES PATENT AND TRADEMARK OFFICE
CERTIFICATE OF CORRECTION

PATENT NO. : 8,280,093 B2
APPLICATION NO. : 12/794690
DATED : October 2, 2012
INVENTOR(S) : Edward Siahaan et al.

It is certified that error appears in the above-identified patent and that said Letters Patent is hereby corrected as shown below:

In the Claims
Claim 6, in column 21, line 35, should be corrected as follows:

6. An ear tip as recited in claim 1, wherein the silicone comprises a silicone gel or a silicone foam.

Claim 12, in column 21, line 64, should be corrected as follows:

12. A method for forming ear tips, the method comprising: configuring a molding station having top and bottom molding plates; first compression molding an inner structure using a first moldable material; curing the formed inner structure; reconfiguring the molding station by replacing one of the top and bottom molding plates; second compression molding at least a portion of an outer structure using a second moldable material; curing the at least a portion of the outer structure that has been formed by the second compression molding; removing a resulting ear tip from the molding station; and applying an outer coating to the at least a portion of the outer structure, wherein the first moldable material comprises an elastomer of a first hardness and wherein the second moldable material comprises an elastomer of a second hardness, the second hardness being less than the first hardness.

Claim 26, in column 23, line 40, should be corrected as follows:

26. A method for forming an ear tip, the method comprising: providing an inner structure for an ear tip; providing a top mold having at least one protrusion; providing a bottom mold having an ear tip cavity; depositing a quantity of a second material into and/or adjacent the ear tip cavity so as to form an outer structure; coupling the top and bottom molds together with the protrusion being inserted into the ear tip cavity; curing the ear tip being formed within the ear tip cavity; after the curing, removing the top mold; removing excess portions of the first material and the second material from the formed ear tip; and removing the formed ear tip from the bottom mold, wherein the inner structure of the formed ear tip comprises an elastomer of a first hardness and wherein the outer structure of the formed ear tip comprises an elastomer of a second hardness, the second hardness being less than the first hardness.

Signed and Sealed this
Fourteenth Day of May, 2013

Teresa Stanek Rea
*Acting Director of the United States Patent and Trademark Office*